United States Patent
Tokita

(10) Patent No.: US 11,407,276 B2
(45) Date of Patent: Aug. 9, 2022

(54) INFORMATION PROVIDING APPARATUS, METHOD FOR PROVIDING INFORMATION, NON-TRANSITORY STORAGE MEDIUM STORING PROGRAM, AND METHOD OF CONTROLLING AIR-CONDITIONER OF VEHICLE

(71) Applicant: TOYOTA JIDOSHA KABUSHIKI KAISHA, Toyota (JP)

(72) Inventor: Hiroyuki Tokita, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 369 days.

(21) Appl. No.: 16/419,757

(22) Filed: May 22, 2019

(65) Prior Publication Data
US 2019/0359029 A1    Nov. 28, 2019

(30) Foreign Application Priority Data

May 24, 2018    (JP) .............................. JP2018-099983

(51) Int. Cl.
*B60H 1/00*    (2006.01)
*G06F 3/14*    (2006.01)
*G08G 1/0967*    (2006.01)

(52) U.S. Cl.
CPC ..... *B60H 1/00771* (2013.01); *B60H 1/00985* (2013.01); *G06F 3/14* (2013.01); *G08G 1/0967* (2013.01)

(58) Field of Classification Search
CPC .... G06F 3/14; G08G 1/0967; B60H 1/00771; B60H 1/00985
See application file for complete search history.

(56) References Cited

U.S. PATENT DOCUMENTS

| | | | |
|---|---|---|---|
| 2015/0105918 A1* | 4/2015 | Lee ........................ | G05B 15/02 700/276 |
| 2017/0096048 A1* | 4/2017 | Larson ............... | B60H 1/00785 |
| 2017/0108236 A1* | 4/2017 | Guan ..................... | H05B 47/11 |
| 2019/0248208 A1* | 8/2019 | Higashitani ........... | B60W 10/04 |
| 2019/0283529 A1* | 9/2019 | Macneille .......... | B60H 1/00657 |
| 2020/0269653 A1* | 8/2020 | Rakshit ............. | B60H 1/00742 |

FOREIGN PATENT DOCUMENTS

| | | | |
|---|---|---|---|
| JP | 2002-318962 A | 10/2002 |
| JP | 2003074943 A | 3/2003 |
| JP | 2003-345872 A | 12/2003 |
| JP | 2006-301973 A | 11/2006 |

(Continued)

*Primary Examiner* — Peter D Nolan
*Assistant Examiner* — Demetra R Smith-Stewart
(74) *Attorney, Agent, or Firm* — Hunton Andrews Kurth LLP

(57) ABSTRACT

An information providing apparatus, includes: a communication unit configured to communicate with a vehicle used by a user; and a control unit configured to receive user information on the user and weather information on weather at an outing destination of the user through the communication unit, the outing destination being obtained based on the user information, and notify, to the vehicle through the communication unit, a set temperature of an air-conditioner of the vehicle based on a sensible temperature derived based on the weather information.

12 Claims, 25 Drawing Sheets

(56) References Cited

FOREIGN PATENT DOCUMENTS

| | | | |
|---|---|---|---|
| JP | 2006352375 | A | 12/2006 |
| JP | 2007-057271 | A | 3/2007 |
| JP | 2009184549 | A | 8/2009 |
| JP | 2012040924 | A | 3/2012 |
| JP | 2014040978 | A | 3/2014 |

\* cited by examiner

FIG. 4

| OUTDOOR TEMPERATURE | SENSIBLE TEMPERATURE |
|---|---|
| 26°C | 21.9°C |
| 21°C | 17°C |
| 16°C | 12.1°C |
| 12°C | 8.2°C |
| 7°C | 3.3°C |
| 6°C | 2.3°C |

FIG. 9

| TYPE OF DAY | TIME PERIOD OF USE | POWER-ON PLACE | | POWER-OFF PLACE | | MEMBER ID | PERSONAL INFORMATION | DESTINATION |
|---|---|---|---|---|---|---|---|---|
| | | LONGITUDE | LATITUDE | LONGITUDE | LATITUDE | ID | PLACE OF BUSINESS | |
| WEEKDAY | 0:00-5:59 | UNAVAILABLE | UNAVAILABLE | UNAVAILABLE | UNAVAILABLE | 111111 | XX CORP. | UNAVAILABLE |
| | 6:00-9:59 | 34.** | 137.** | 34.** | 137.** | 111111 | XX CORP. | COMPANY |
| | 10:00-11:59 | UNAVAILABLE | UNAVAILABLE | UNAVAILABLE | UNAVAILABLE | 111111 | XX CORP. | UNAVAILABLE |
| | 12:00-12:59 | UNAVAILABLE | UNAVAILABLE | UNAVAILABLE | UNAVAILABLE | 111111 | XX CORP. | UNAVAILABLE |
| | 13:00-16:59 | UNAVAILABLE | UNAVAILABLE | UNAVAILABLE | UNAVAILABLE | 111111 | XX CORP. | UNAVAILABLE |
| | 17:00-23:59 | 34.** | 137.** | 34.** | 137.** | 111111 | XX CORP. | RESIDENCE |

FIG. 10

| TYPE OF DAY | TIME PERIOD OF USE | POWER-ON PLACE | | POWER-OFF PLACE | | MEMBER ID | PERSONAL INFORMATION | DESTINATION |
| --- | --- | --- | --- | --- | --- | --- | --- | --- |
| | | LONGITUDE | LATITUDE | LONGITUDE | LATITUDE | ID | PLACE OF BUSINESS | |
| WEEKDAY | 0:00-5:59 | UNAVAILABLE | UNAVAILABLE | UNAVAILABLE | UNAVAILABLE | 111111 | XX CORP. | UNAVAILABLE |
| | 6:00-9:59 | 34.** | 137.** | 34.** | 137.** | 111111 | XX CORP. | COMPANY |
| | 10:00-11:59 | 34.** | 137.** | 34.** | 137.** | 111111 | XX CORP. | BUSINESS TRIP DESTINATION |
| | 12:00-12:59 | UNAVAILABLE | UNAVAILABLE | UNAVAILABLE | UNAVAILABLE | 111111 | XX CORP. | UNAVAILABLE |
| | 13:00-16:59 | UNAVAILABLE | UNAVAILABLE | UNAVAILABLE | UNAVAILABLE | 111111 | XX CORP. | UNAVAILABLE |
| | 17:00-23:59 | 34.** | 137.** | 34.** | 137.** | 111111 | XX CORP. | RESIDENCE |

FIG. 11

| TYPE OF DAY | TIME PERIOD OF USE | POWER-ON PLACE | | POWER-OFF PLACE | | MEMBER ID | PERSONAL INFORMATION | DESTINATION |
|---|---|---|---|---|---|---|---|---|
| | | LONGITUDE | LATITUDE | LONGITUDE | LATITUDE | ID | PLACE OF BUSINESS | |
| HOLIDAY | 0:00-5:59 | UNAVAILABLE | UNAVAILABLE | UNAVAILABLE | UNAVAILABLE | 111111 | XX CORP. | UNAVAILABLE |
| | 6:00-9:59 | 34.** | 137.** | 34.** | 137.** | 111111 | XX CORP. | CONVENIENCE STORE |
| | 10:00-11:59 | 34.** | 137.** | 34.** | 137.** | 111111 | XX CORP. | RESIDENCE |
| | 12:00-12:59 | UNAVAILABLE | UNAVAILABLE | UNAVAILABLE | UNAVAILABLE | 111111 | XX CORP. | UNAVAILABLE |
| | 13:00-16:59 | 34.** | 137.** | 34.** | 137.** | 111111 | XX CORP. | SUPERMARKET |
| | 17:00-23:59 | 34.** | 137.** | 34.** | 137.** | 111111 | XX CORP. | RESIDENCE |

FIG. 12

| TYPE OF DAY | TIME PERIOD OF USE | POWER-ON PLACE | | POWER-OFF PLACE | | MEMBER ID | PERSONAL INFORMATION | DESTINATION |
|---|---|---|---|---|---|---|---|---|
| | | LONGITUDE | LATITUDE | LONGITUDE | LATITUDE | ID | PLACE OF BUSINESS | |
| HOLIDAY | 0:00-5:59 | UNAVAILABLE | UNAVAILABLE | UNAVAILABLE | UNAVAILABLE | 111111 | XX CORP. | UNAVAILABLE |
| | 6:00-9:59 | 34.** | 137.** | 34.** | 137.** | 111111 | XX CORP. | CONVENIENCE STORE |
| | 10:00-11:59 | UNAVAILABLE | UNAVAILABLE | UNAVAILABLE | UNAVAILABLE | 111111 | XX CORP. | RESIDENCE |
| | 12:00-12:59 | UNAVAILABLE | UNAVAILABLE | UNAVAILABLE | UNAVAILABLE | 111111 | XX CORP. | UNAVAILABLE |
| | 13:00-16:59 | 34.** | 137.** | 34.** | 137.** | 111111 | XX CORP. | DEPARTMENT STORE |
| | 17:00-23:59 | 34.** | 137.** | 34.** | 137.** | 111111 | XX CORP. | RESIDENCE |

FIG. 13

| TYPE OF DAY | TIME PERIOD OF USE | POWER-ON PLACE | | POWER-OFF PLACE | | MEMBER ID | PERSONAL INFORMATION | DESTINATION |
| --- | --- | --- | --- | --- | --- | --- | --- | --- |
| | | LONGITUDE | LATITUDE | LONGITUDE | LATITUDE | ID | PLACE OF BUSINESS | |
| HOLIDAY-SUNDAY | 0:00-5:59 | UNAVAILABLE | UNAVAILABLE | UNAVAILABLE | UNAVAILABLE | 111111 | XX CORP. | UNAVAILABLE |
| | 6:00-9:59 | 34.** | 137.** | 34.** | 137.** | 111111 | XX CORP. | CONVENIENCE STORE |
| | 10:00-11:59 | 34.** | 138.** | 34.** | 138.** | 111111 | XX CORP. | RESORT |
| | 12:00-12:59 | 34.** | 138.** | 34.** | 138.** | 111111 | XX CORP. | RESORT |
| | 13:00-16:59 | 34.** | 138.** | 34.** | 138.** | 111111 | XX CORP. | RESORT |
| | 17:00-23:59 | 34.** | 137.** | 34.** | 137.** | 111111 | XX CORP. | RESIDENCE |

FIG. 16

| OUTDOOR TEMPERATURE | CLOTHES INDEX | CLOTHES | SENSIBLE TEMPERATURE | CLOTHES INDEX | CLOTHES |
|---|---|---|---|---|---|
| 26°C | 80-90 | | 21.9°C | 60-70 | |
| 21°C | 60-70 | | 17°C | 40-50 | |
| 16°C | 40-50 | | 12.1°C | 40-50 | |
| 12°C | 40-50 | | 8.2°C | 0-30 | |
| 7°C | 0-30 | | 3.3°C | 0-30 | |
| 6°C | 0-30 | | 2.3°C | 0-30 | |

FIG. 18

| OUTDOOR TEMPERATURE | CLOTHES INDEX | CLOTHES | SENSIBLE TEMPERATURE | CLOTHES INDEX | CLOTHES |
|---|---|---|---|---|---|
| 26°C | 80-90 | | 21.9°C | 60-70 | |

INFORMATION PROVIDING APPARATUS, METHOD FOR PROVIDING INFORMATION, NON-TRANSITORY STORAGE MEDIUM STORING PROGRAM, AND METHOD OF CONTROLLING AIR-CONDITIONER OF VEHICLE

INCORPORATION BY REFERENCE

The disclosure of Japanese Patent Application No. 2018-099983 filed on May 24, 2018 including the specification, drawings and abstract is incorporated herein by reference in its entirety.

BACKGROUND

1. Technical Field

The present disclosure relates to an information providing apparatus, a method for providing information, and a non-transitory storage medium storing a program, and a method of controlling an air-conditioner of a vehicle.

2. Description of Related Art

There are techniques of providing information regarding the weather at outing destinations for users to make preparations before going on their outings. For example, Japanese Patent Application Publication No. 2007-057271 (JP 2007-057271 A) proposes a system for notifying a user of a physical sensibility that is a degree indicating how the user feels about the weather condition at a local destination in order to allow the user to determine how lightly or heavily the user should dress at the local destination on the day of an outing.

SUMMARY

In JP 2007-057271 A, the physical sensibility at an outing destination is determined on a server and output to and displayed on a client terminal. However, the displayed physical sensibility is merely numerical information. Accordingly, it is difficult for a user to determine how hot or cold the outing destination actually is, so that the user may have a trouble of selecting clothes and accessories. Thus, there is room for an improvement in the techniques of providing the information regarding the weather at an outing destination.

The present disclosure provides a more improved technique for providing information regarding the weather in an outing destination.

A first aspect of the disclosure provides an information providing apparatus, including: a communication unit configured to communicate with a vehicle used by a user; and a control unit configured to receive user information on the user and weather information on weather at an outing destination of the user through the communication unit, the outing destination being obtained based on the user information, and notify, to the vehicle through the communication unit, a set temperature of an air-conditioner of the vehicle based on a sensible temperature derived based on the weather information.

In the first aspect, the control unit may be configured to determine the set temperature in accordance with the sensible temperature and information on vehicle cabin humidity of the vehicle.

In the first aspect, the control unit may be configured to determine a second set temperature in accordance with an outdoor temperature at the outing destination, and notify the second set temperature to the vehicle through the communication unit.

In the first aspect, the control unit may be configured to display clothes information corresponding to each of the sensible temperature and an outdoor temperature at the outing destination on at least one of a display unit of the vehicle and a display unit of a terminal device of the user.

In the above configuration, the control unit may be configured to store a selection history of the clothes information selected by the user, and display the selection history on at least one of the display unit of the vehicle and the display unit of the terminal device of the user.

In the first aspect, the control unit may be configured to display information indicating at least one of raindrops, ripples, necessity of an umbrella, and wiper operation, on at least one of a display unit of the vehicle and a display unit of a terminal device of the user based on a precipitation amount of the outing destination.

In the above configuration, the control unit may be configured to display the information indicating at least one of the raindrops, the ripples, the necessity of the umbrella, and the wiper operation, on at least one of the display unit of the vehicle and the display unit of the terminal device of the user, further based on information on a use history of wipers of other vehicles at the outing destination.

In the first aspect, the control unit may be configured to calculate the sensible temperature at the outing destination based on the weather information.

In the first aspect, the control unit may be configured to receive the weather information including information on the sensible temperature.

A second aspect of the disclosure provides a method for providing information, including: receiving user information on a user using a vehicle and weather information on weather at an outing destination, the outing destination being obtained based on the user information; obtaining a sensible temperature at the outing destination based on the weather information; and notifying, to the vehicle, a set temperature of an air-conditioner of the vehicle, the set temperature being derived based on the sensible temperature.

A third aspect of the disclosure provides a non-transitory storage medium storing a program, the program, upon being executed on a computer, causing the computer to execute the method for providing information according to the second aspect.

A fourth aspect of the disclosure provides a method of controlling an air-conditioner of a vehicle, including: acquiring user information on a user using the vehicle and information on an outing destination based on the user information; and controlling, based on a sensible temperature derived based on weather information on weather at the outing destination, the air-conditioner of the vehicle.

The aspects of the disclosure can improve the technique of providing information regarding the weather at an outing destination.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 4 shows a correspondence table between outdoor temperature and sensible temperature;

FIG. 9 shows one example of action pattern data;

FIG. 10 shows another example of the action pattern data;

FIG. 11 shows another example of the action pattern data;

FIG. 12 shows another example of the action pattern data;

FIG. 13 shows another example of the action pattern data;

FIG. 16 shows a display example of clothes information;

FIG. 18 shows another display example of the clothes information;

DETAILED DESCRIPTION OF EMBODIMENTS

Description is now given of the embodiments of the present disclosure.

First Embodiment

Configuration of Information Providing System

Figure 1:
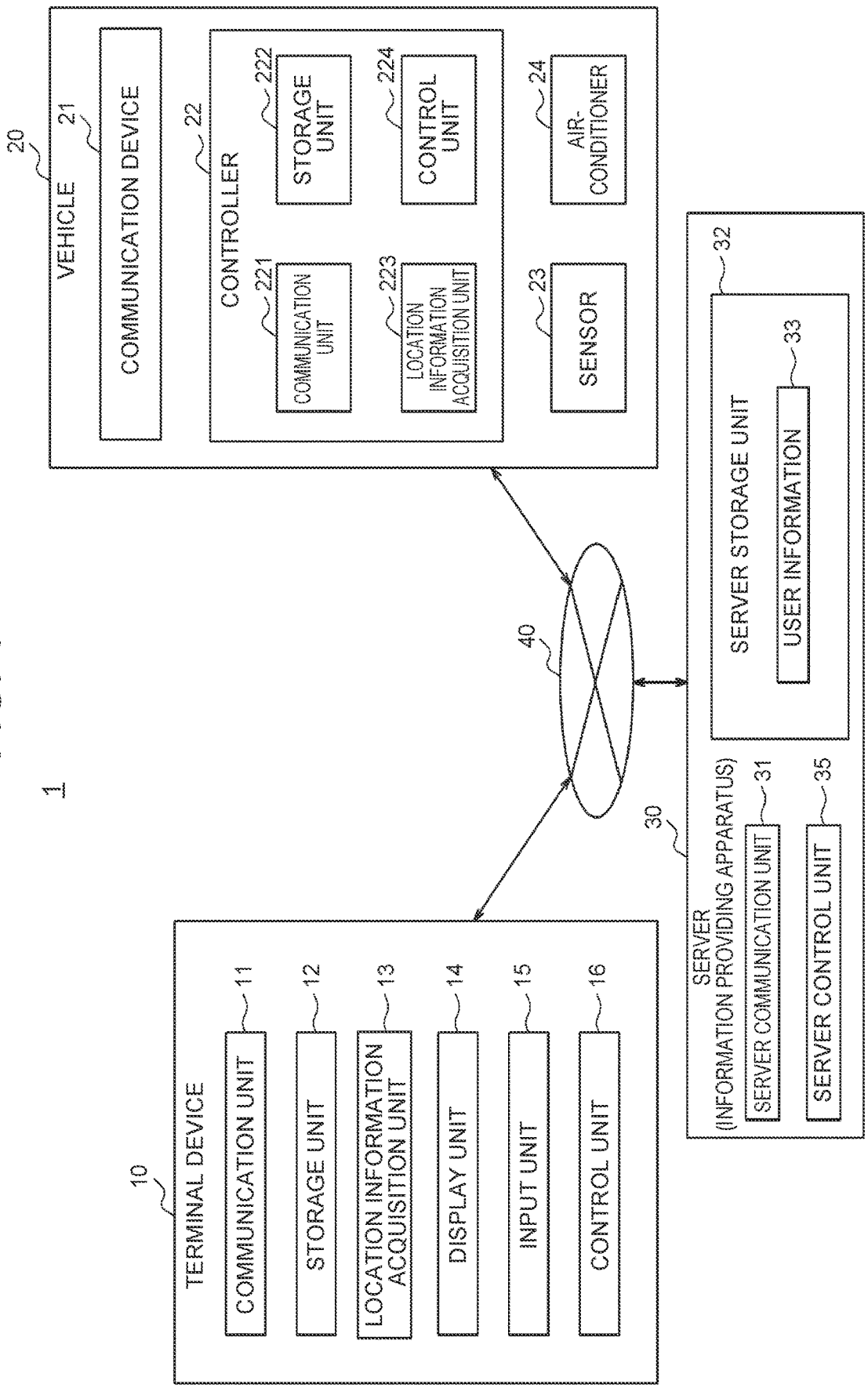
FIG. 1 shows the schematic configuration of an information providing system according to a first embodiment.

With reference to FIG. 1, the outline of an information providing system 1 according to one embodiment of the present disclosure will be described. The information providing system 1 includes a terminal device 10, a vehicle 20, and a server 30. In FIG. 1, one terminal device 10 and one vehicle 20 are described for convenience of description. However, the number of the terminal devices 10 and the vehicles 20 included in the information providing system 1 may optionally be determined. The terminal device 10, the vehicle 20, and the server 30 are connected to a network 40. The network 40 includes, for example, a mobile object communication network, and the Internet. However, without being limited to these, the network 40 may include any communication networks.

The terminal device 10 is a general-purpose mobile terminal, such as a smartphone or a tablet terminal. However, without being limited to this, the terminal device 10 may be any mobile terminal, such as a device dedicated for the information providing system 1. The terminal device 10 is possessed by a user. The vehicle 20 is an automobile, for example. However, without being limited to the automobile, the vehicle 20 may be any vehicle in which humans can ride. The vehicle 20 is a vehicle driven by a user. However, without being to this, the vehicle 20 may be, for example, a vehicle that performs autonomous driving. The autonomous driving includes, for example, autonomous driving of levels 1 to 5 defined by Society of Automotive Engineers (SAE). However, without being limited to these, the autonomous driving may optionally be defined. The server 30 includes one or more server apparatuses communicable with each other. The present embodiment is described on the assumption that one server 30 is provided as a server apparatus for convenience of description. The server 30 is one example of the "information providing apparatus."

In the information providing system 1 according to the present embodiment, the vehicle 20 is controlled such that information regarding the weather at an outing destination is provided in cooperation with the terminal device 10, the vehicle 20, and the server 30. In general, in the information providing system 1, the server 30 receives information (user information 33) concerning a user from the terminal device 10 or the like, and receives information on the weather at an outing destination based on the user information from an external server or the like. The server 30 also calculates a sensible temperature at the outing destination based on the weather information. The server 30 then notifies, to the vehicle 20, a set temperature of an air-conditioner 24 of the vehicle 20 based on the sensible temperature. The vehicle 20 which received the notification controls the air-conditioner 24 based on the set temperature. As described later, the user information 33, which includes information (schedule information) relating to the schedule of a user, can identify the outing destination of the user based on the information.

Thus, the information providing system 1 calculates the sensible temperature of the outing destination with the information on the weather at the outing destination, and notifies, to the vehicle 20, the set temperature of the air-conditioner 24 of the vehicle based on the calculated sensible temperature. The vehicle 20 then controls the air-conditioner 24 of the vehicle 20 based on the notified set temperature. Accordingly, the user who rides in the vehicle 20 can feel the sensible temperature of the outing destination before going to the outing destination, and make use of the sensible temperature for preparation of clothes, accessories, and the like. Thus, the technique of providing the information regarding the weather at an outing destination can be improved.

Next, component members of the information providing system 1 will each be described in detail.

Configuration of Terminal Device

As shown in FIG. 1, the terminal device 10 includes a communication unit 11, a storage unit 12, a location information acquisition unit 13, a display unit 14, an input unit 15, and a control unit 16.

The communication unit 11 includes a communication module connected to the network 40. For example, the communication unit 11 may include a communication module in conformity with 4th generation (4G) and 5th generation (5G) mobile object communication standards. In the present embodiment, the terminal device 10 is connected to the network 40 through the communication unit 11.

The storage unit 12 includes one or more memories. Although examples of the "memory" include a semiconductor memory, a magnetic memory, or an optical memory in the present embodiment, the memory is not limited to these. The memory or memories included in the storage unit 12 may each function as a main storage, an auxiliary storage, or a cache memory, for example. The storage unit 12 stores any information that is used for operation of the terminal device 10. For example, the storage unit 12 may store information such as a system program, application programs, information on identification of the terminal device 10, and user identification information. The application programs include an exclusive application (hereinafter referred to as an exclusive application) relating to the information providing system. In the information providing system, the server 30 uses the exclusive application to collect the user information 33. The information stored in the storage unit 12 may be updated with the information that is acquired from the network 40 through the communication unit 11, for example.

The location information acquisition unit 13 includes one or more receivers corresponding to any global positioning system. For example, the location information acquisition unit 13 may include a global positioning system (GPS) receiver. The location information acquisition unit 13 acquires information on the location of the terminal device 10.

The display unit 14 includes one or more output interfaces which visually output information to the user. Although examples of the output interface included in the display unit 14 include a panel display, the output interface is not limited to this.

The input unit 15 includes one or more input interfaces which detect user input. Examples of the input interface included in the input unit 15 include a physical key, an electrostatic capacity key, a touchscreen integrally provided with the panel display of the display unit 14, or a microphone which receives voice input. However, the input interface is not limited to these.

The control unit 16 includes one or more processors. In the present embodiment, the "processor" is a general-purpose processor or an exclusive processor dedicated for specific processing. However, the "processor" is not limited to these. The control unit 16 controls operation of the entire terminal device 10.

For example, the control unit 16 stores the information on the location of the terminal device 10, acquired by the location information acquisition unit 13, in the storage unit 12. The control unit 16 notifies information on the identification of the user and the information on the location of the terminal device 10 stored in the storage unit 12 to the server 30 through the communication unit 11. Notification to the server 30 may be performed at any timing. For example, the control unit 16 performs notification to the server 30 at specified time intervals or whenever the terminal device 10 is put in a specific state. The control unit 16 may eliminate the information on the location of the terminal device 10 which is notified to the server 30 from the storage unit 12.

Figure 2:
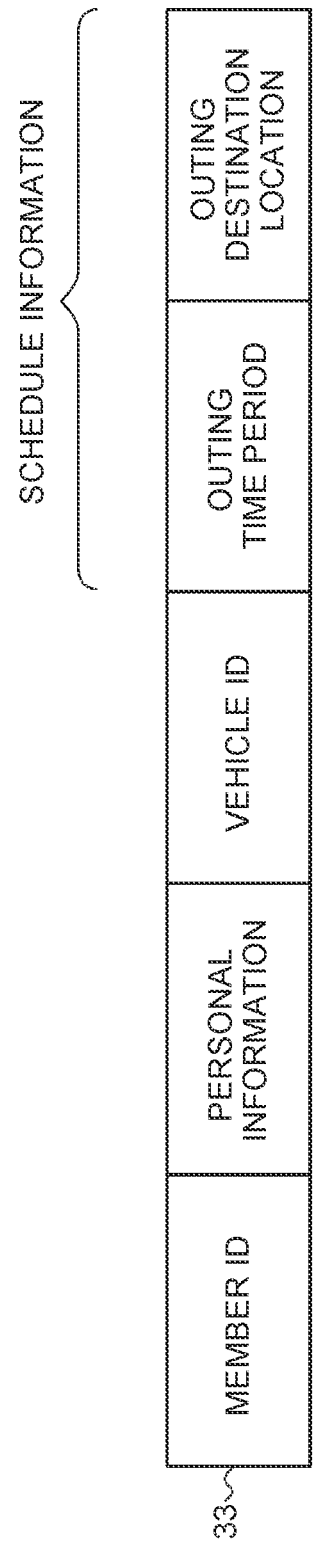
FIG. 2 is a concept view showing one example of user information according to the first embodiment.

The control unit 16 transmits the user information 33 to the server 30 through the communication unit 11. The control unit 16 collects and manages the user information 33 with use of the exclusive application. FIG. 2 shows one example of the user information 33. The user information 33 shown in FIG. 2 includes a member ID, personal information, vehicle ID, and information on a schedule of a user. The member ID is identification information for uniquely identifying a user in this system. The personal information includes a sex, age, birthday, address, family, occupation, place of business, year of entering a company, telephone number, and e-mail address of a user. The vehicle ID is the information for uniquely identifying the vehicle 20. As the vehicle ID, information on identification of a communication device 21 or a controller 22 included in the vehicle 20 may be used. Information on identification of devices mounted on the vehicle 20, such as a navigation device (on-board device ID), may also be used as the vehicle ID, for example. The schedule information, which relates to an outing destination of a user, includes an outing time period and an outing destination location, for example. The user preinstalls an exclusive application in the terminal device 10 in order to use the information providing system. For example, an authentication process, or the like, relating to the system may be performed when the exclusive application is started up for the first time, and the user information 33 may be collected on the screen for authentication process.

The exclusive application may ask a user to approve collection of the user information after the user installs the exclusive application, for example. When the exclusive application receives an approval from the user, the server 30 collects the user information 33. The user information may be collected by various kinds of methods. For example, the server 30 may collect the user information 33 from the terminal device 10. Alternatively, the server 30 may collect the user information 33 from an external server which manages the user information 33. For example, when the exclusive application is started up in the terminal device 10, and the user information 33 is transmitted to the external server, the server 30 may acquire the user information 33 from the external server based on the approval of the user.

Vehicle Configuration

As shown in FIG. 1, the vehicle 20 includes the communication device 21, the controller 22, a sensor 23, and the air-conditioner 24. The communication device 21, the controller 22, the sensor 23, and the air-conditioner 24 are communicably connected with the vehicle 20 through, for example, an on-board network such as a controller area network (CAN) or an exclusive line.

The communication device 21 may be an on-board transmitter, such as a data communication module (DCM), for example. The communication device 21 may include a communication module in conformity with 4G and 5G mobile object communication standards so as to connect to the network 40.

The controller 22 is a device which performs vehicle control of the vehicle 20. The vehicle control includes air conditioning control and information providing control, for example. For example, the controller 22 performs vehicle control based on set temperature notified from the server 30 through the communication device 21. As shown in FIG. 1, the controller 22 includes a communication unit 221, a storage unit 222, a location information acquisition unit 223, and a control unit 224.

The communication unit 221 includes a communication module which communicates with the communication device 21 and respective electronic control units (ECUs). For example, CAN can be adopted as a communication protocol used when the communication unit 221 communicates with the communication device 21 and each of the ECUs.

The storage unit 222 includes one or more memories. The memory or memories included in the storage unit 222 may each function as a main storage, an auxiliary storage, or a cache memory, for example. The storage unit 222 stores any information that is used for operation of the controller 22. For example, the storage unit 222 may store information such as a system program, application programs, and database. The information stored in the storage unit 222 may be updated with the information that is acquired from the network 40 through the communication device 21, for example.

The location information acquisition unit 223 includes one or more receivers corresponding to any global positioning system. For example, the location information acquisition unit 223 may also include a GPS receiver. The location information acquisition unit 223 acquires information on the location of the vehicle 20.

The control unit 224 includes one or more processors. The control unit 224 controls operation of the entire controller 22.

For example, the control unit 224 acquires the location information on the vehicle 20 from the location information acquisition unit 223 through the communication unit 221. The control unit 224 acquires the information (sensor information) obtained by the sensor 23 of the vehicle 20 from each of the ECUs through the communication unit 221. The sensor 23 may include a LIDAR, an acceleration sensor, an angular velocity sensor, a magnetic sensor, an atmospheric pressure sensor, an illuminance sensor, an outdoor temperature sensor, a vehicle cabin temperature sensor, a vehicle cabin humidity sensor, a vehicle cabin wind speed sensor, and an image sensor (camera). The control unit 224 acquires the information detected by the sensor 23 as sensor information. The control unit 224 transmits the sensor information to the communication device 21 through the communication unit 221, and transmits to the server 30 with the communication device 21. Here, notification to the server 30 may be performed at any timing. For example, the control unit 224 performs notification to the server 30, whenever the vehicle 20 is put in a specific state (for example, in a parked state, a state where an occupant left the vehicle, or the like).

For example, the control unit 224 receives notification of the set temperature of the air-conditioner 24 from the communication device 21 through the communication unit 221. The set temperature is notified from the server 30. The control unit 224 also controls the air-conditioner 24 based on the notified set temperature. The control is executed such that the controller 22 and the ECUs, or the like, of the vehicle 20 cooperate with each other.

The air-conditioner 24 includes at least one of a cabin air conditioning, a steering air conditioning, and a seat air conditioning. The cabin air conditioning is a device which increases or decreases temperature with an air sent from an air blowoff port of the air conditioning. The steering air conditioning is a device which increases or decreases temperature by the entire perimeter of the steering. The seat air conditioning is a device which increases or decreases temperature by a seat. The control unit 224 performs air conditioning control by controlling at least one of the cabin air conditioning, the steering air conditioning, and the seat air conditioning. To control only some of the air conditioning, the system may enable a user to set an air conditioning mode of the vehicle 20. The terminal device 10 may set the air conditioning mode and transmit the set mode to the vehicle 20, or the controller 22 may receive user input.

Server Configuration

As shown in FIG. 1, the server 30 includes a server communication unit 31, a server storage unit 32, and a server control unit 35.

The server communication unit 31 includes a communication module connected to the network 40. For example, the server communication unit 31 may include a communication module in conformity with prescribed wire standards or wireless standards. In the present embodiment, the server 30 is connected to the network 40 through the server communication unit 31.

The server storage unit 32 includes one or more memories. The memory or memories included in the server storage unit 32 may each function as a main storage, an auxiliary storage, or a cache memory, for example. The server storage unit 32 stores any information that is used for operation of the server 30. For example, the server storage unit 32 stores the user information 33 collected from the terminal device 10 or the like. For example, the server storage unit 32 may store information such as a system program, application programs, and database. The information stored in the server storage unit 32 may be updated with the information that is acquired from the network 40 through the server communication unit 31, for example.

The server control unit 35 includes one or more processors. The server control unit 35 controls operation of the entire server 30.

For example, the server control unit 35 receives the user information 33 from the terminal device 10 through the server communication unit 31. The server control unit 35 stores the user information 33 in the server storage unit 32.

The server control unit 35 also acquires information on the weather at an outing destination location in an outing time period from an external server through the server communication unit 31 with use of the schedule information (outing time period and outing destination location) included in the user information 33. In other words, the server control unit 35 receives the information on the weather at the outing destination based on the user information 33, from the external server or the like through the server communication unit 31. The weather information includes information on temperature, humidity, and wind speed, for example. The external server is managed and operated by a weather company, for example.

The server control unit 35 also calculates sensible temperature at the outing destination based on the received information on the weather at the outing destination. The sensible temperature is calculated, for example, from a net effective temperature (NET) formula. The NET formula, which is a formula for calculating sensible temperature (Tm) in consideration of humidity and wind speed, is expressed by a following expression (1):

$$Tm=37-(37-t)/(0.68-0.0014h+(1/A))-0.29T\times(1-(h/100))(1) \quad \text{Expression 1}$$

where $A=1.76+1.4V^{0.75}$, T: temperature (° C.), h: humidity (%), v: wind speed (m/s)

For example, when temperature is 20° C., humidity is 60%, and wind speed is 1 m/s, the sensible temperature becomes 16° C. based on the expression (1). Instead of the NET formula, other formula, such as Missenard's formula, may be used for calculating the sensible temperature.

The server control unit 35 notifies the set temperature of the air-conditioner 24 of the vehicle 20 based on the sensible temperature to the vehicle 20 through the server communication unit 31. The set temperature is equivalent to the sensible temperature, for example. The sensible temperature may be received as the information on the weather from an external server through the server communication unit 31.

Operation of Information Providing System According to First Embodiment

Figure 3:
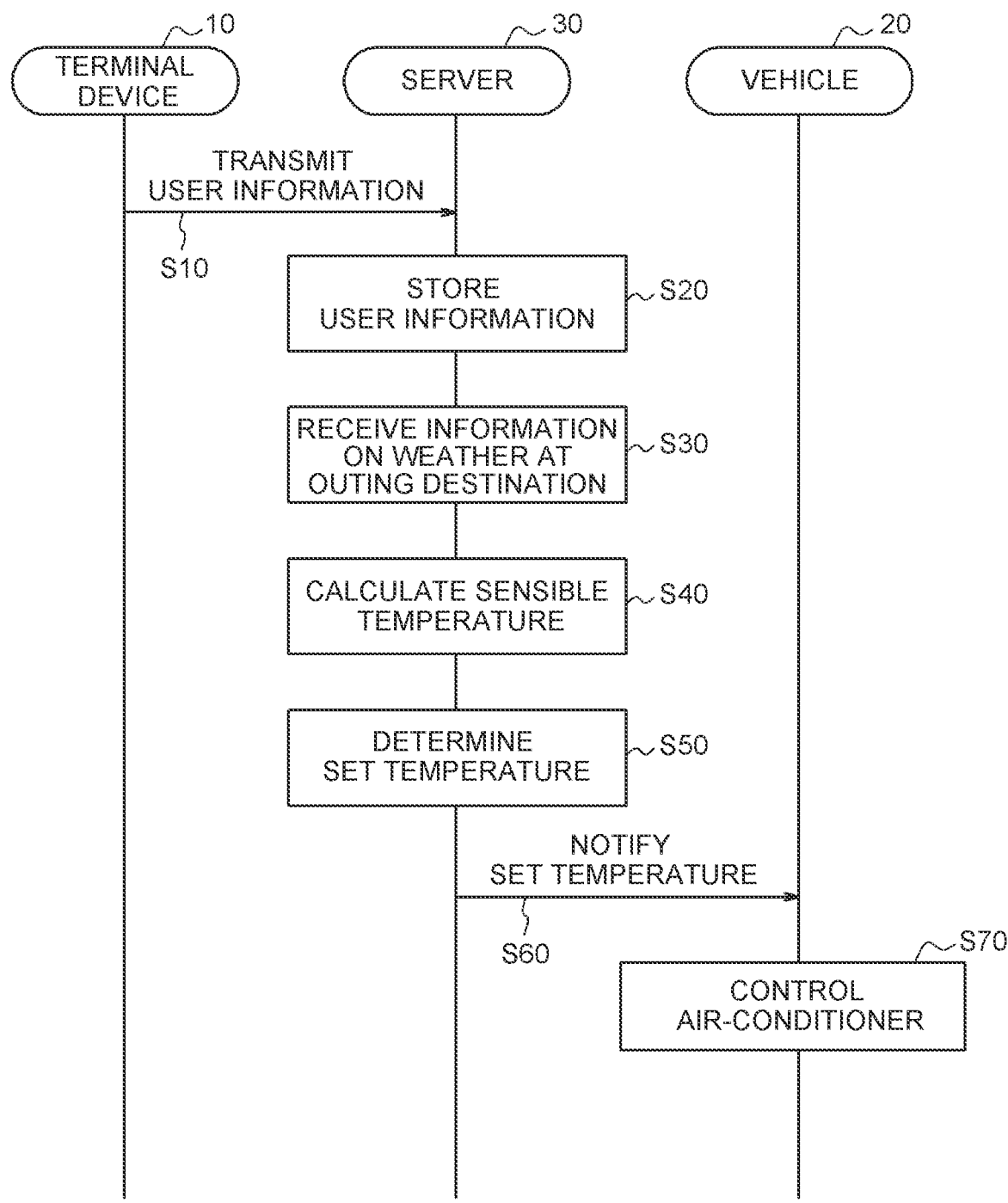
FIG. 3 is a sequence diagram showing operation of the information providing system according to the first embodiment.

Description is now given of the operation of the information providing system 1 with reference to a sequence diagram of FIG. 3.

Step S10: the terminal device 10 transmits the user information 33 to the server 30 through the communication unit 11.

Step S20: the server 30 stores the user information acquired from the terminal device 10 in the server storage unit 32.

Step S30: the server 30 acquires information on the weather at an outing destination location in an outing time period from an external server or the like with use of the schedule information (outing time period and outing destination location) included in the user information 33. In other words, the server 30 receives the information on the weather at the outing destination based on the user information 33 from the external server or the like.

Step S40: the server 30 calculates the sensible temperature at the outing destination based on the received information on the weather at the outing destination.

Step S50: the server 30 determines a set temperature of the air-conditioner of the vehicle 20 based on the sensible temperature.

Step S60: the server 30 notifies the determined set temperature to the vehicle 20.

Step S70: the vehicle 20 controls the air-conditioner 24 based on the set temperature notified from the server 30.

Thus, the information providing system 1 according to the present embodiment controls, the air-conditioner 24 of the vehicle 20 based on the set temperature corresponding to the sensible temperature at the outing destination. Accordingly, the user who rides in the vehicle 20 can feel the sensible temperature of the outing destination, before going to the outing destination. Hence, the system can support the actions of the user such that the user can prepare the clothes and accessories suitable for the sensible temperature before an outing, or postpone or cancel the outing itself. Thus, the information providing system 1 according to the present embodiment can improve the technique of providing the information regarding the weather at an outing destination.

The server control unit 35 may determine the set temperature in accordance with the sensible temperature and information on the sensor of the vehicle 20. The sensor information includes information relating to vehicle cabin humidity and wind speed. In this case, the server control unit 35 uses the sensor information and the expression (1), in which a set temperature is substituted for a temperature T, and determines the set temperature such that the sensible temperature in the vehicle substantially coincides with the sensible temperature at the outing destination. In this way, the set temperature is determined in consideration of factors which influence the sensible temperature, such as the vehicle cabin humidity in the vehicle 20 and the wind speed. Accordingly, since the set temperature of the air-conditioner 24 is determined such that the sensible temperature at the outing destination coincides with the sensible temperature in the vehicle, the sensible temperature at the outing destination can be reproduced more faithfully in the vehicle.

The control unit 224 of the vehicle 20 may perform control on the air-conditioner 24 based on a request from a user. For example, in the case where the user goes to an outing destination on the next day, the control unit 224 may receive a request for the information regarding the weather at the outing destination by voice or by user input from the user. When receiving the request by voice, the control unit 224 receives voice such as "show me the temperature at the tomorrow's outing destination" from the user through an input interface, for example. Upon reception of the request from the user, the control unit 224 controls the air-conditioner 24. Alternatively, the control unit 224 may automatically perform control without receiving a request from the user. For example, the control unit 224 may control the air-conditioner 24 predetermined time before going to the outing destination (for example, the day before going to the outing destination). In this case, the control unit 224 may notify the user that the air-conditioner 24 is controlled based on the notified set temperature.

In the embodiment described above, the server control unit 35 determines a control target vehicle 20 based on the vehicle ID in the user information 33. However, the server control unit 35 may determine the control target vehicle 20 based on the information on the location of the terminal device 10, and the information on the location of the vehicle 20. For example, the server control unit 35 may determine whether or not the terminal device 10 is present in a prescribed range of the vehicle 20 based on the location information acquired from the terminal device 10 and the location information acquired from the vehicle 20. When determining that the terminal device 10 and the vehicle 20 are present in the prescribed range, the server control unit 35 may notify the set temperature to the vehicle 20, and the vehicle 20 may perform vehicle control. In this way, in the case where, for example, the vehicle 20 used by the user cannot be identified, the target vehicle 20 can reliably be controlled.

Modification

Figure 5:
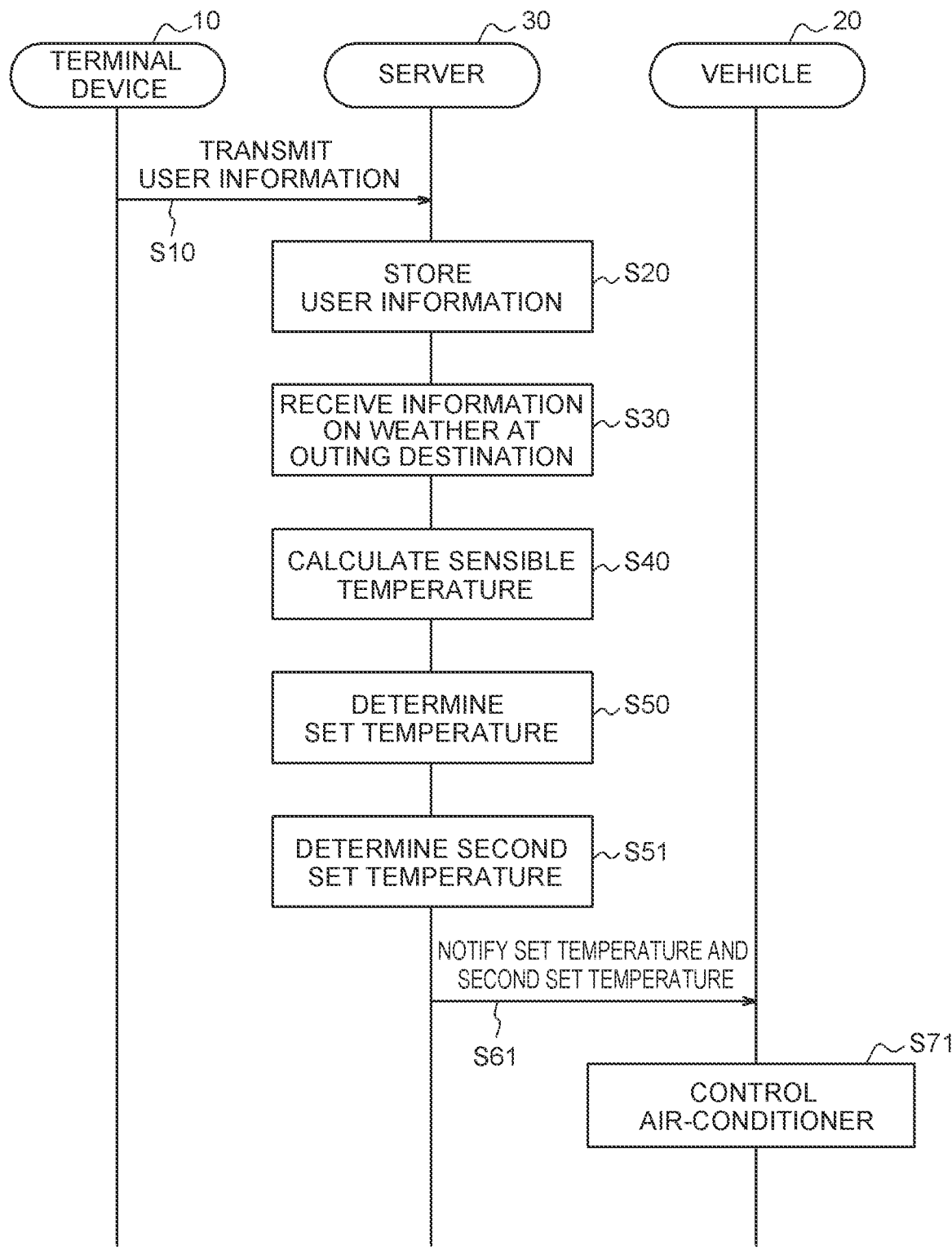
FIG. 5 is a sequence diagram showing a modification of the operation of the information providing system.

The server control unit 36 may determine a set temperature (hereinafter referred to as a second set temperature) corresponding to outdoor temperature at an outing destination other than the set temperature based on the sensible temperature at the outing destination. In this case, the server control unit 36 also notifies the second set temperature to the vehicle 20 through the server communication unit 31. The control unit 224 of the vehicle 20 controls the air-conditioner 24 based on the notified set temperature and second set temperature. FIG. 4 shows a correspondence table between outdoor temperature and sensible temperature. In the example shown in FIG. 4, all the corresponding outdoor temperatures and sensible temperatures are different under the influence of humidity, wind speed, and the like. For example, the control unit 224 may perform control by switching the set temperature of the air-conditioner 24 to one of the notified set temperature and second set temperature every fixed period of time (for example, every three minutes). FIG. 5 shows a sequence diagram of the operation in the modification. The operation identical to the operation described in FIG. 3 is designated by identical reference numeral to omit the description thereof.

Step S51: the server 30 determines a set temperature of the air-conditioner 24 of the vehicle 20 based on an outdoor temperature at an outing destination.

Step S61: the server 30 notifies the determined set temperature and second set temperature to the vehicle 20.

Step S71: the vehicle 20 controls the air-conditioner 24 based on the set temperature and the second set temperature notified from the server 30.

The information providing system 1 according to the modification enables the user to feel both the outdoor temperature and the sensible temperature at the outing destination in the vehicle. The user can prepare the clothes and accessories suitable for the sensible temperature by feeling a difference between the outdoor temperature and the sensible temperature.

The server control unit 35 may determine the second set temperature in accordance with the outside temperature at the outing destination and information on the sensor of the vehicle 20. The sensor information includes information relating to vehicle cabin humidity and wind speed. In this case, the server control unit 35 uses the sensor information and the expression (1), in which a second set temperature is substituted for T, and determines the second set temperature such that a value of the sensible temperature in the vehicle substantially coincides with a value of the outdoor temperature at the outing destination. In this way, the second set temperature is determined in consideration of influencing factors, such as the vehicle cabin humidity in the vehicle 20 and the wind speed. Accordingly, since the set temperature of the air-conditioner 24 is determined such that the outdoor temperature at the outing destination coincides with the sensible temperature in the vehicle, the outdoor temperature at the outing destination can be reproduced more faithfully in the vehicle. This enables the user to feel the difference between the outdoor temperature and the sensible temperature.

Second Embodiment

Figure 6:
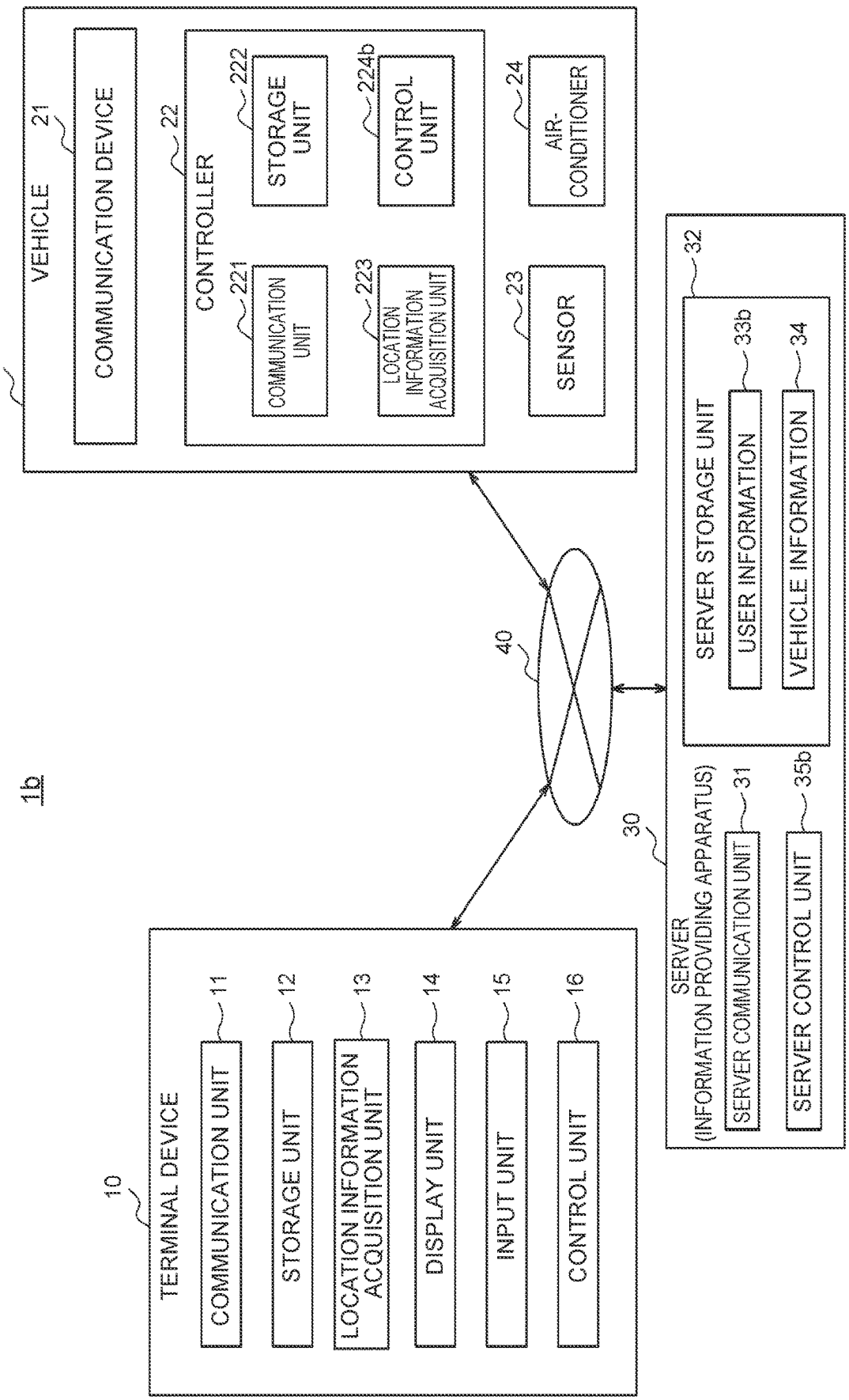
FIG. 6 shows the schematic configuration of an information providing system according to a second embodiment.

Hereinafter, a second embodiment will be described. FIG. 6 is a block diagram showing the configuration of an information providing system 1b according to the second embodiment of the present disclosure. Component members identical to those in the first embodiment are designated by identical reference numerals to omit the description thereof. In general, the information providing system 1b is different in the configuration of user information from the first embodiment. The information providing system 1b according to the second embodiment is different in that the vehicle 20 transmits vehicle information to the server 30, and the server 30 performs a process of estimating an outing destination with use of the user information and the vehicle information.

Figure 7:
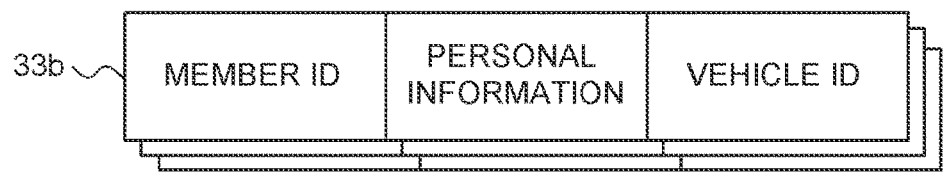
FIG. 7 is a concept view showing one example of user information according to the second embodiment.

FIG. 7 shows one example of user information 33b according to the second embodiment. The user information 33b according to the second embodiment includes member ID, personal information, and vehicle ID of a user. The user information 33b does not include schedule information.

Figure 8:
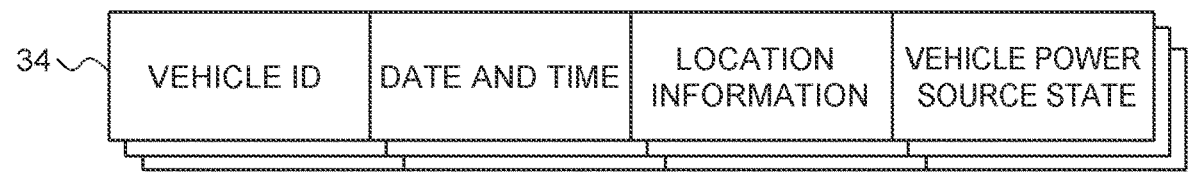
FIG. 8 is a concept view showing one example of vehicle information according to the second embodiment.

A control unit 224b of the vehicle 20 acquires information (vehicle information 34) relating to the vehicle 20 from the location information acquisition unit 223, electronic control units (ECUs), and the like through the communication unit 221. FIG. 8 shows one example of the vehicle information 34. The vehicle information 34 shown in FIG. 8 includes vehicle ID, date and time, location information, and information relating to a vehicle power source state. The date and time is the information indicating the time when the location information and the vehicle power source state are acquired. The location information indicates the location of the vehicle 20 acquired by the location information acquisition unit 223. The vehicle power source state includes an on-off state of an accessory power source (ACC-ON or ACC-OFF), and an on-off state of an ignition (IGN-ON or IGN-OFF). The vehicle information 34 may also include sensor information obtained by the sensor 23 mounted on the vehicle 20 other than the information described before.

A server control unit 35b of the server 30 receives the vehicle information 34 from the vehicle 20 through the server communication unit 31. The server control unit 35b stores the vehicle information 34 in the server storage unit 32.

The server control unit 35b estimates an outing destination from an action pattern of a user that is based on the user information 33b and the vehicle information 34. The server control unit 35b generates action pattern data based on the user information 33b and the vehicle information 34. FIGS. 9 to 13 show examples of the pattern data on a specific user. The action pattern data includes type of day, time period of use, power-ON place, power-OFF place, member ID, personal information, and information relating to a destination. The type of day is obtained by classifying days of the week into either a weekday or a holiday. The time period of use is obtained by dividing one day into prescribed time periods. In the examples of FIGS. 9 to 13, one day is divided into six time periods. The power-ON place is the location information when the power source of the vehicle 20 is turned on. The power-ON place includes latitude and longitude information. The power-OFF place is the location information when the power source of the vehicle 20 is turned off. The power-OFF place includes latitude and longitude information. The type of day, the time period of use, the power-ON place, and the power-OFF place are all determined based on the vehicle information 34. The member ID and the personal information are determined based on the user information 33b. The destination represents a destination of the user in each corresponding time period of use. The destination is identified by the server control unit 35b based on the type of day, the time period of use, the power-ON place, the power-OFF place, and the personal information. Hereinafter, the process of estimating an outing destination based on the respective action pattern data of FIGS. 9 to 13 will be described.

In the action pattern data of FIG. 9, the destination of the user is a company or a residence. The server control unit 35b estimates the destination other than the residence as an outing destination. That is, in this case, the server control unit 35b estimates that the company is an outing destination of the user.

In the action pattern data of FIG. 10, the destination of the user is a company, a business trip destination, or a residence. The server control unit 35b estimates the destination other than the residence as an outing destination. When the destination includes a company and a business trip destination, priority is given to the business trip destination. That is, in this case, the server control unit 35b estimates the business trip destination as an outing destination of the user.

Figure 14:
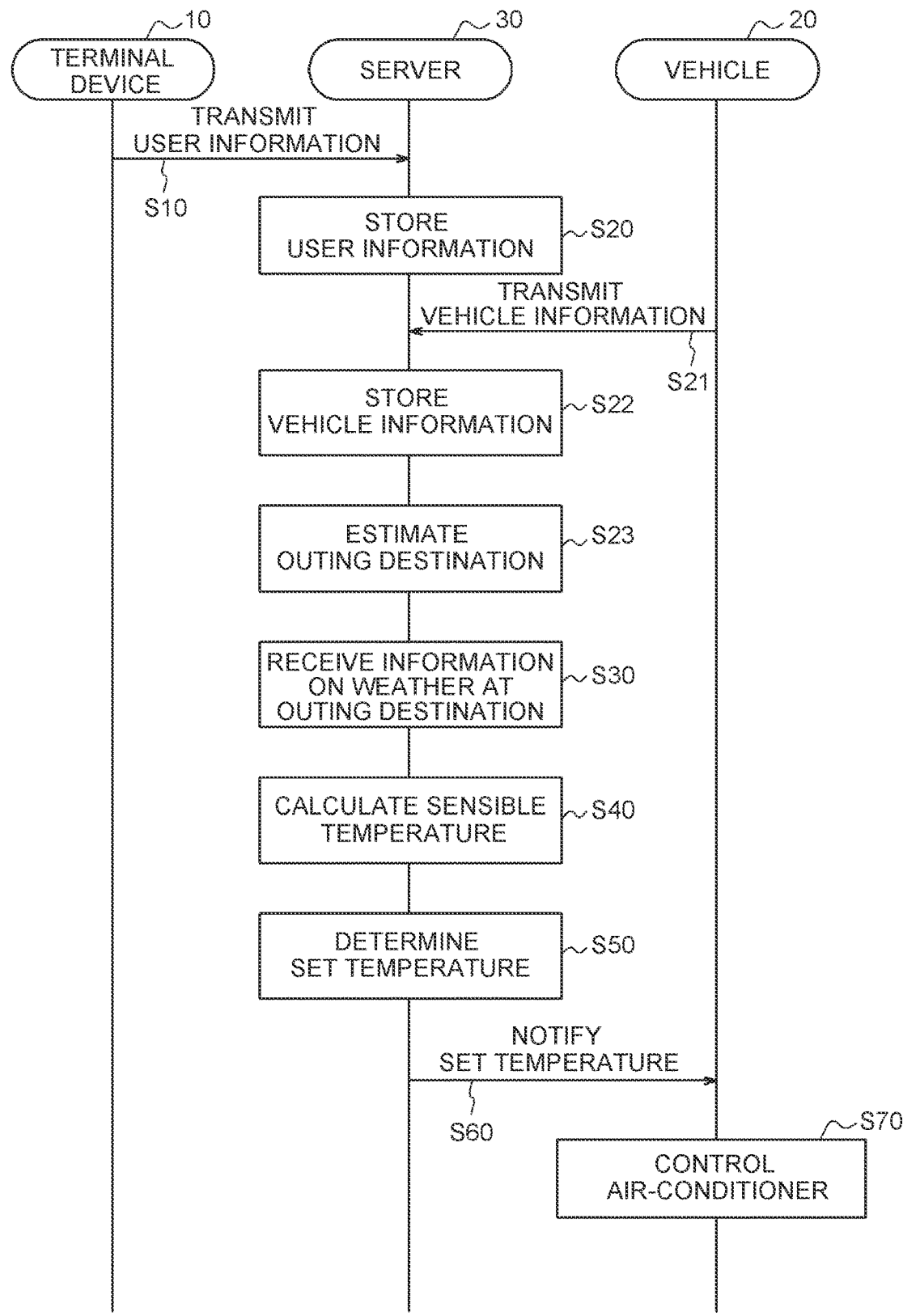
FIG. 14 is a sequence diagram showing operation of the information providing system according to the second embodiment.

In the action pattern data of FIG. 11, the destination of the user is a convenience store, a supermarket or a residence. The server control unit 35b estimates the destination other than the residence as an outing destination. When there is a plurality of destinations, the server control unit 35b may compare the information on the weather at each of the destinations, and estimates the destination lower in sensible temperature as an outing destination. Here, it is assumed that the sensible temperature around the supermarket is lower than the sensible temperature around the convenience store. In this case, the server control unit 35b estimates the supermarket as an outing destination of the user. The server control unit 35b may notify the estimated outing destination to the terminal device 10. Based on the notification, the display unit 14 of the terminal device 10 may display the information relating to the estimated outing destination. The server control unit 35b may also estimate both the convenience store and the supermarket as an outing destination. In this case, based on the route of outing, the server control unit 35b estimates the convenience store as a first outing destination, and controls air conditioning based on the sensible temperature at the outing destination. Then, the server control unit 35b estimates the supermarket as an outing destination, and controls air conditioning based on the sensible temperature at the outing destination In the action pattern data of FIG. 12, the destination of the user is a convenience store, a department store, or a residence. The server control unit 35b estimates the destination other than the residence as an outing destination. When there is a plurality of destinations, the server control unit 35b may estimate the destination further from a current location as an outing destination. It is assumed herein that the department store is further than the convenience store. In this case, the server control unit 35b estimates the department store as an outing destination of the user. The server control unit 35b may notify the estimated outing destination to the terminal device 10. Based on the notification, the display unit 14 of the terminal device 10 may display the information relating to the estimated outing destination. The server control unit 35b may also estimate both the convenience store and the department store as outing destinations. In this case, based on the route of outing, the server control unit 35b estimates the convenience store as a first outing destination, and controls air conditioning based on the sensible temperature at the outing destination. Then, the server control unit 35b estimates the department store as an outing destination, and controls air conditioning based on the sensible temperature at the outing destination In the action pattern data of FIG. 13, the destination of the user is a convenience store, a resort, or a residence. The server control unit 35b estimates the destination other than the residence as an outing destination. When there is a plurality of destinations as in the above cases, the server control unit 35b may estimate the destination further from a current location as an outing destination. It is assumed herein that the resort is further than the convenience store. In this case, the server control unit 35b estimates the resort as an outing destination of the user. The server control unit 35b may notify the estimated outing destination to the terminal device 10. Based on the notification, the display unit 14 of the terminal device 10 may display the information relating to the estimated outing destination. The server control unit 35b may also estimate both the destinations as outing destinations. In this case, based on the route of outing, the server control unit estimates the convenience store as a first outing destination, and controls air conditioning based on the sensible temperature at the outing destination. Then, the server control unit 35b estimates the resort as an outing destination, and controls air conditioning based on the sensible temperature at the outing destination Operation of Information Providing System According to Second Embodiment Description is now given of the operation of the information providing system 1b with reference to a sequence diagram of FIG. 14. In general, the information providing system 1b estimates an outing destination from the action pattern of the user based on the user information 33b and the vehicle information 34, and receives information on the weather at the estimated outing destination. Hereinafter, each of the steps is described. The operation identical to the operation described in FIG. 3 is designated by identical reference numeral to omit the description thereof.

Step S21: the vehicle 20 transmits the vehicle information 34 to the server 30 through the communication device 21.

Step S22: the server 30 stores the vehicle information 34 acquired from the vehicle 20 in the server storage unit 32.

Step S23: the server 30 estimates an outing destination from an action pattern of the user that is based on the user information 33b and the vehicle information 34. Subsequent steps S30 to S70 are identical to the operation described in FIG. 3.

Thus, according to the information providing system 1b according to the second embodiment, an outing destination is estimated from the action pattern of the user, and the air-conditioner 24 of the vehicle 20 is controlled based on the set temperature corresponding to the sensible temperature at the outing destination. Therefore, even in the case where information on the schedule of the user is not available, it is possible to estimate an outing destination from the action pattern of the user, and perform air conditioning control based on the sensible temperature at the estimated outing destination.

Third Embodiment

Figure 15:
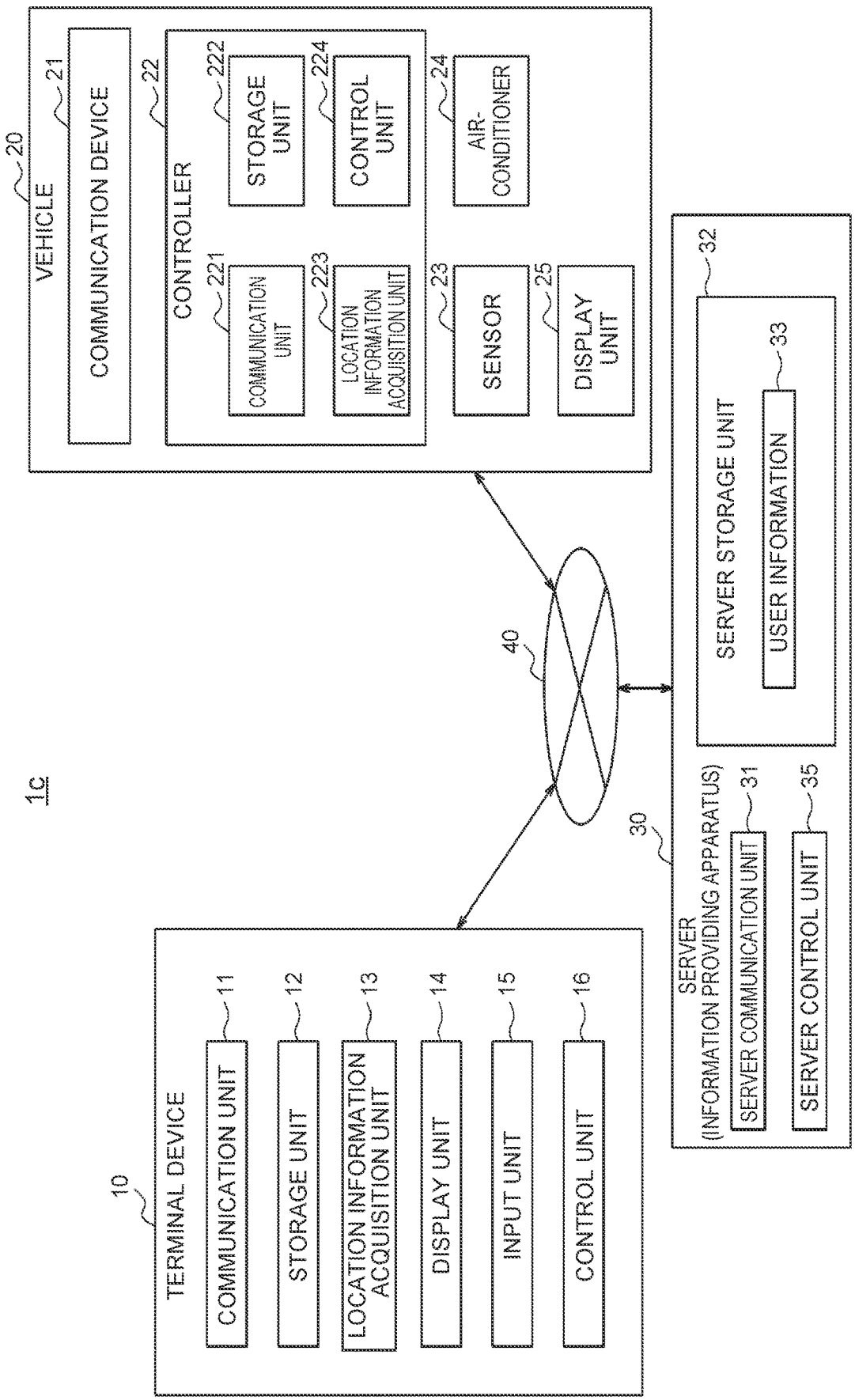
FIG. 15 shows the schematic configuration of an information providing system according to a third embodiment.

Hereinafter, a third embodiment will be described. FIG. 15 is a block diagram showing the configuration of an information providing system 1c according to the third embodiment of the present disclosure. Component members identical to those in the first embodiment are designated by identical reference numerals to omit the description thereof. In general, the information providing system 1c is different from the first embodiment in the configuration of providing clothes information. The vehicle 20 according to the third embodiment includes a display unit 25. The display unit 25 includes one or more output interfaces which visually output information to the user. Although examples of the output interface included in the display unit 14 include a panel display and a head-up display, the output interface is not limited to these. In the information providing system 1c according to the third embodiment, the display unit 25 of the vehicle 20 provides a user with clothes information by video output.

Table 1 shows one example of correspondence between temperature and a clothes guide. The clothes guide indicates standard clothes and accessories at pertinent temperature.

TABLE 1

| Temperature | Clothes Guide |
| --- | --- |
| 26° C. or more | Light clothes such as short-sleeved shirt |
| 21° C. or more and below 26° C. | Short-sleeved shirt or long-sleeved shirt |
| 16° C. or more and below 21° C. | Clothes layered |
| 12° C. or more and below 16° C. | Lighter outer |
| 7° C. or more and below 12° C. | Heavy clothes |
| Below 7° C. | Cold protection measures necessary |

As shown in table 1, in the range of 12° C. or more and below 26° C., the clothes guide changes in a comparatively narrow temperature range. Hence, in this temperature range, it tends to become difficult to select clothes. When outdoor temperature and sensible temperature are different, the clothes corresponding to the outdoor temperature are often not necessarily appropriate. Accordingly, the present embodiment provides information on clothes recommended at the outdoor temperature and the sensible temperature in an outing destination to support the user in selection of clothes.

FIG. 16 shows display examples of the clothes information displayed on the display unit 25. In FIG. 16, outdoor temperatures, clothes indexes and clothes corresponding to the outdoor temperatures, sensible temperatures, clothes indexes and clothes corresponding to the sensible temperatures are shown, respectively. The clothes indexes are predetermined values indicating recommended clothes for respective temperatures. A higher clothes index indicates lighter clothes, and a lower clothes index indicates heavier clothes. A clothes column displays images and indicators of the clothes corresponding to the respective clothes indexes. The display unit 25 displays the clothes information corresponding to each of the outdoor temperature and the sensible temperature at an outing destination.

Operation of Information Providing System According to Third Embodiment

Figure 17:
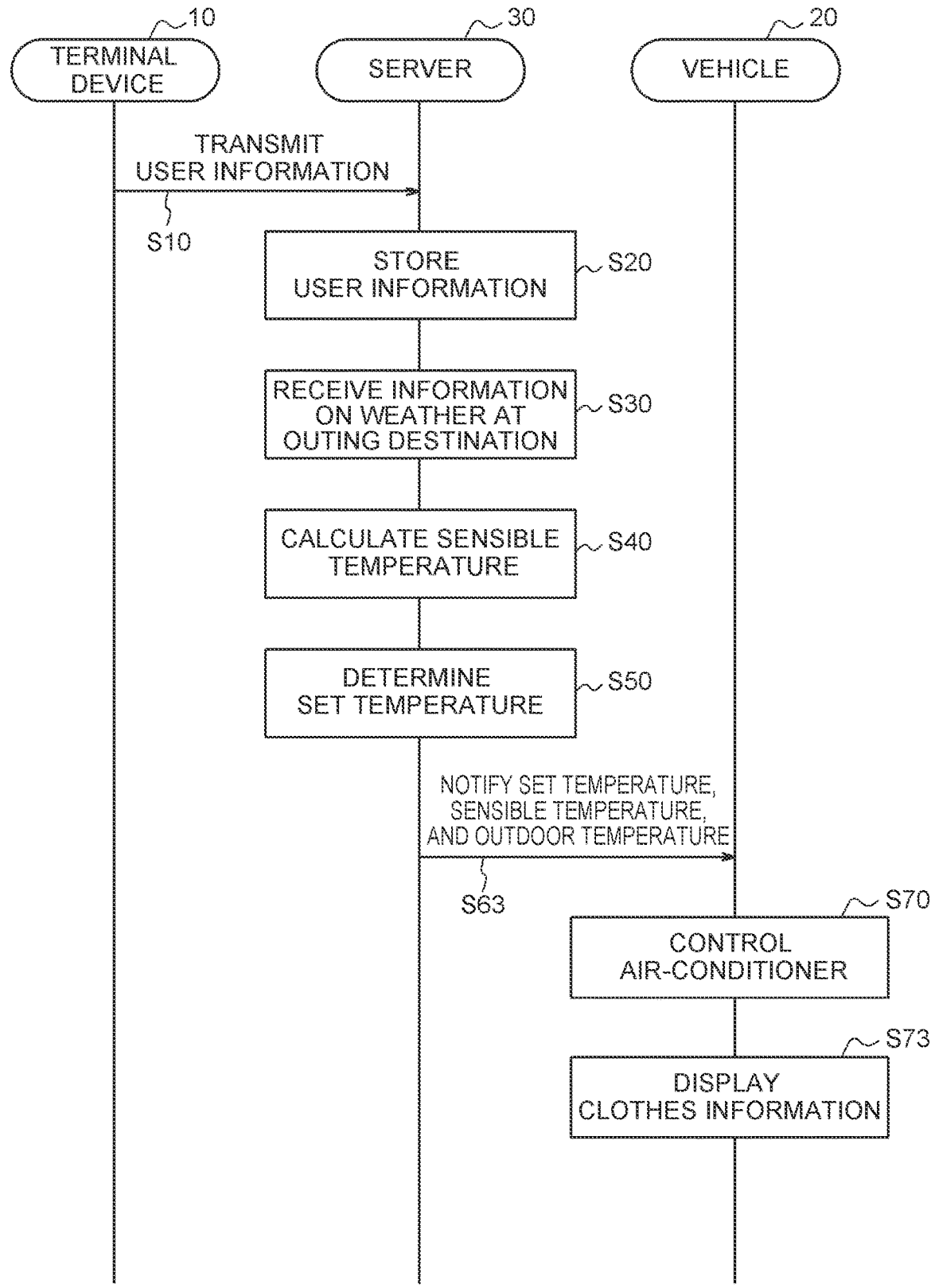
FIG. 17 is a sequence diagram showing operation of the information providing system according to the third embodiment.

Description is now given of the operation of an information providing system 1c with reference to a sequence diagram of FIG. 17. The operation identical to the operation described in FIG. 3 is designated by identical reference numeral to omit the description thereof.

Step S63: the server 30 notifies, to the vehicle 20, a sensible temperature and an outdoor temperature at an outing destination in addition to the set temperature determined in step S50.

Step S73: the vehicle 20 displays clothes information corresponding to each of the sensible temperature and the outdoor temperature based on the notified sensible temperature and outdoor temperature.

The information providing system 1c according to the third embodiment controls the air-conditioner 24 of the vehicle 20 based on the set temperature corresponding to the sensible temperature at an outing destination, and provides a user with the clothes information recommended at the outing destination. Therefore, the system enables the user to feel the sensible temperature at the outing destination, and supports the user in selection of clothes, which makes it possible to improve the technique of providing the information regarding the weather at the outing destination. Since the information providing system 1c can display the clothes information corresponding to each of the sensible temperature and the outdoor temperature, the user can prepare the clothes suitable for the outing destination with knowledge of a difference between the clothes recommended at the outdoor temperature and the sensible temperature.

Although the display unit 25 of the vehicle 20 displays the clothes information in the present embodiment, the present disclosure is not limited to this example. For example, the server control unit 36 may transmit the information on the sensible temperature and the outdoor temperature to the terminal device 10, and the display unit 14 of the terminal device 10 may display the clothes information. Both the display unit 25 of the vehicle 20 and the display unit 14 of the terminal device 10 may display the clothes information. In other words, the server 30 may cause at least one of the display unit 25 of the vehicle 20 and the display unit 14 of the terminal device 10 to display the clothes information corresponding to each of the sensible temperature and the outdoor temperature.

Figure 19:
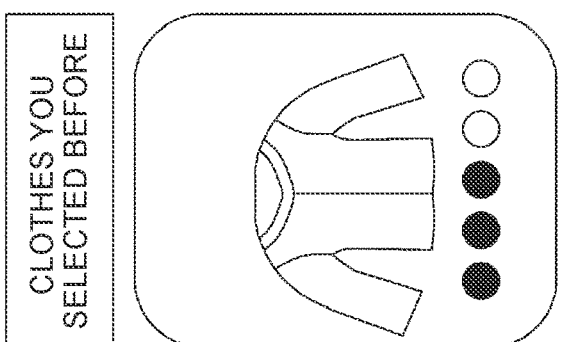
FIG. 19 shows a display example for displaying a selection history of the clothes information.

The server control unit 36 may display the clothes information corresponding to each of the sensible temperature and the outdoor temperature, and makes the user select one of the clothes information. The server control unit 36 may store a selection history of the clothes information selected by the user, and displays the selection history on at least one of the display unit 25 of the vehicle 20 and the display unit 14 of the terminal device 10. FIG. 18 shows display examples of selectable clothes information displayed on the display unit 25. As shown in FIG. 18, a user can select one of the clothes information corresponding to outdoor temperature and the clothes information corresponding to sensible temperature. FIG. 19 shows a display example for displaying a selection history of the clothes information. The server control unit 36 stores information on the selection history of a user in the server storage unit 32. The information according to the selection history is binary information relating to whether the user selected clothes information corresponding to outdoor temperature or whether the user selected clothes information corresponding to sensible temperature. FIG. 19 shows the case where the user selected the clothes information corresponding to sensible temperature before. As shown in FIG. 19, the selection history is displayed such that the user can distinguish the clothes selected before. Thus, the user can consider the clothes to wear to an outing destination in consideration of the past selection history.

In the present embodiment, the outing destination is identified based on user information in steps S10 to S30. However, the present disclosure is not limited to this. For example, when the user information does not include schedule information, the vehicle 20 may transmit the vehicle information 34 to the server 30, and the server 30 may estimate the outing destination with use of the vehicle information 34 as in the second embodiment.

Fourth Embodiment

Figure 20:
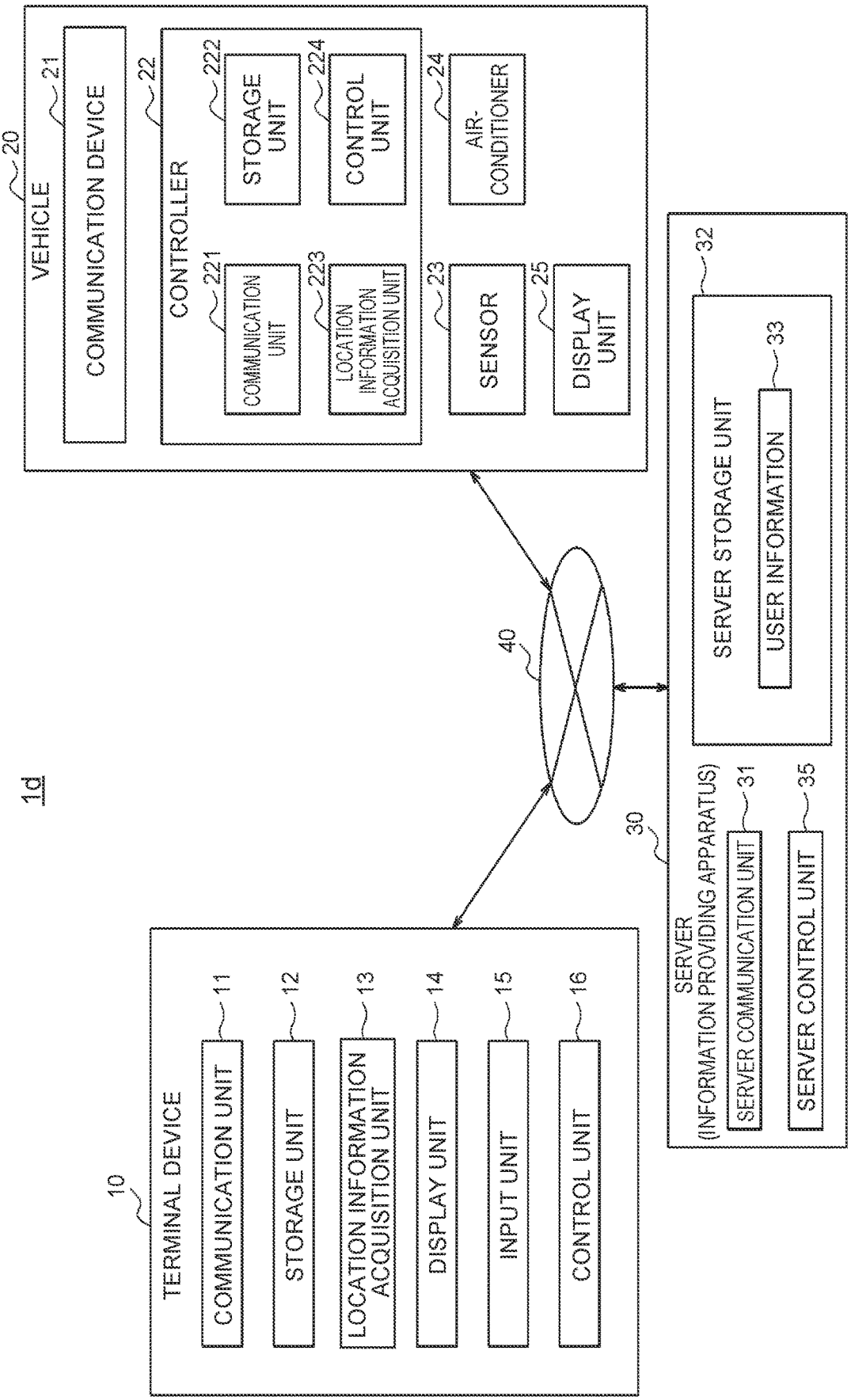
FIG. 20 shows the schematic configuration of an information providing system according to a fourth embodiment.
Figure 21:
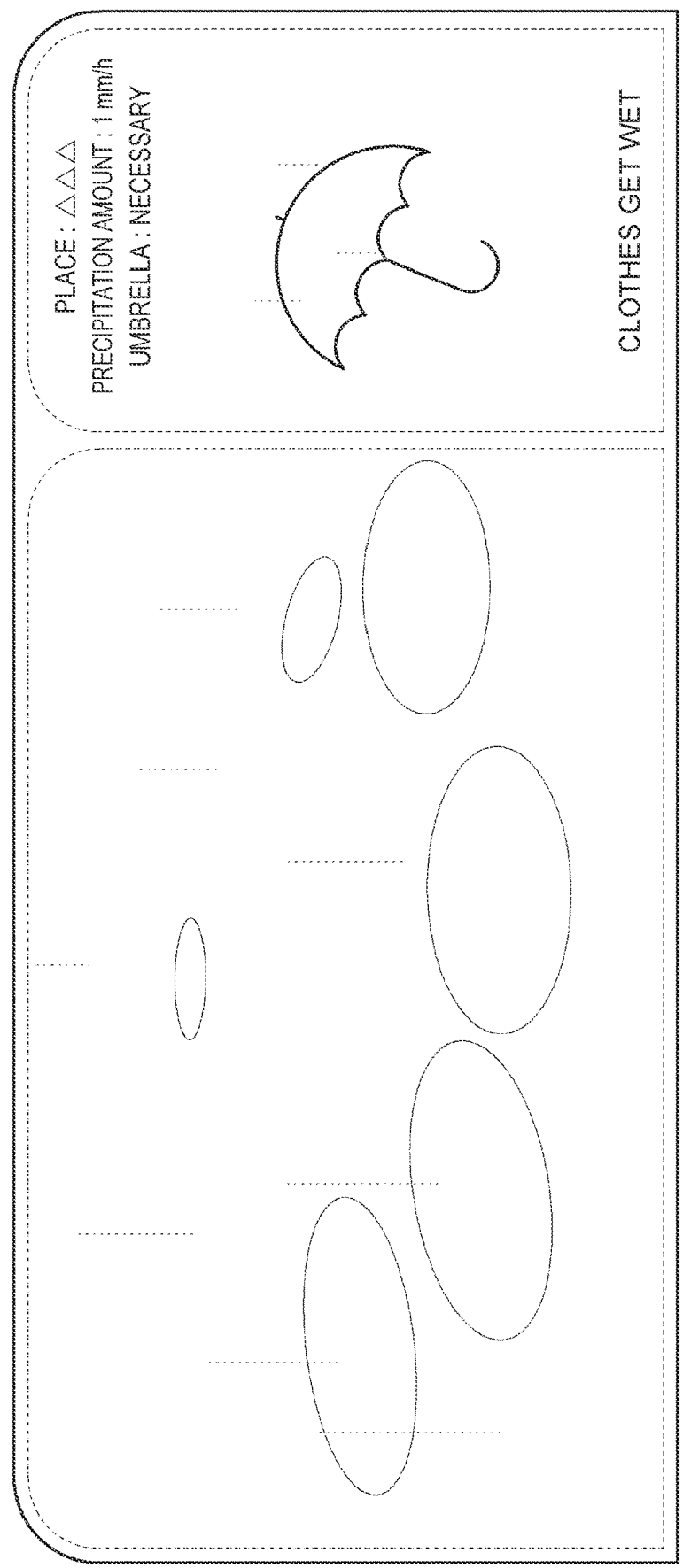
FIG. 21 shows one example of display corresponding to a precipitation amount.

Hereinafter, a fourth embodiment will be described. FIG. 20 is a block diagram showing the configuration of an information providing system 1d according to the fourth embodiment of the present disclosure. Since the configuration of the information providing system 1d according to the fourth embodiment is identical to the configuration of the third embodiment, description thereof is omitted. In general, the information providing system 1d performs display control in accordance with a precipitation amount at an outing destination. In the fourth embodiment, the information on the weather at an outing destination includes information relating to the precipitation amount at the outing destination. The server control unit 35 notifies the precipitation amount at the outing destination to the vehicle 20 through the server communication unit 31. The display unit 25 of the vehicle 20 provides a user with display in accordance with the precipitation amount by video output.

FIGS. 21 to 24 show examples of a display screen corresponding to the precipitation amount displayed on the display unit 25. The display screen of FIG. 21, which includes information on an outing destination, raindrops, ripples, and the necessity of an umbrella, indicates that an umbrella is necessary and that clothes will get wet. The information on raindrops and ripples are designed such that the details are depicted more as the precipitation amount becomes larger. The information on the necessity of an umbrella is determined depending on whether the precipitation amount is a prescribed value or more. The information on the necessity of an umbrella and the information alerting that clothes will get wet, or the like, may be highlighted by a changed display color, a changed character size, or the like.

Figure 22:
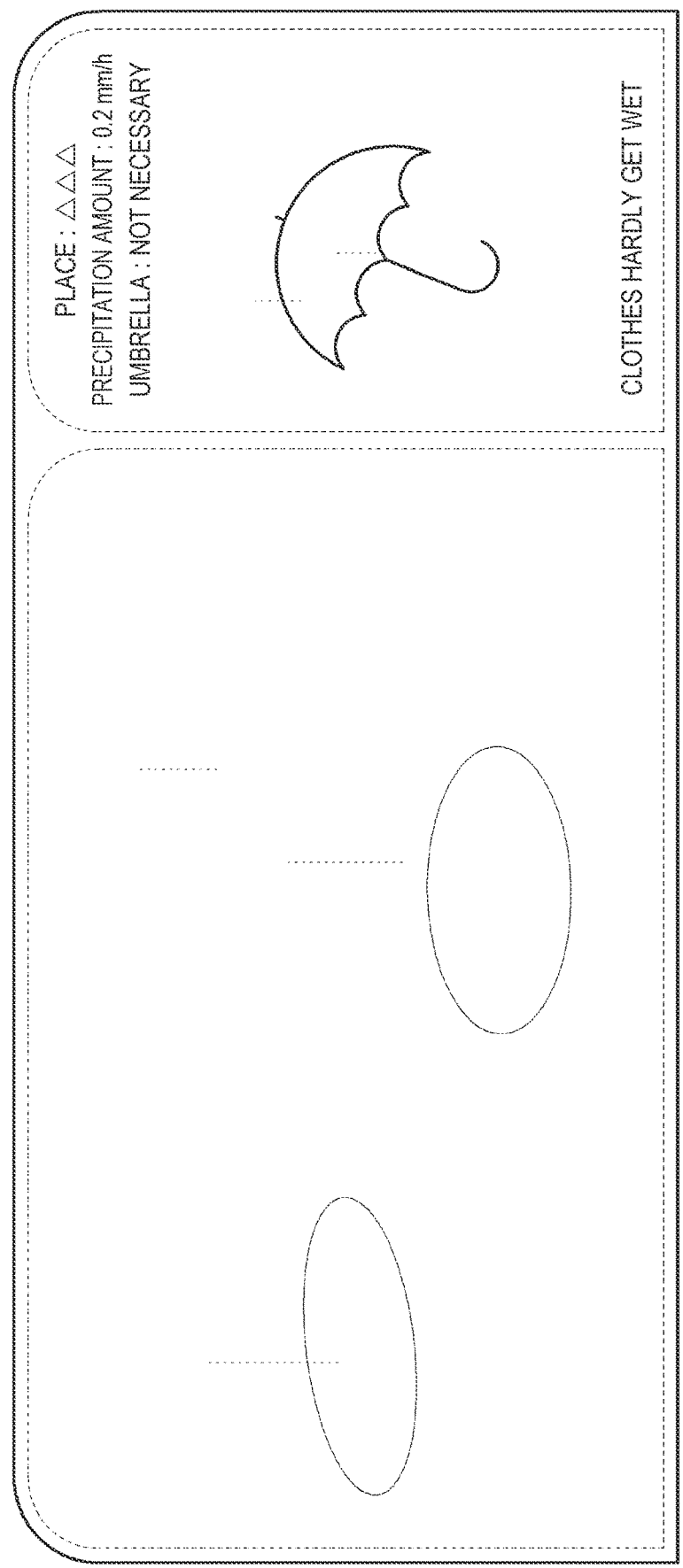
FIG. 22 shows another example of the display corresponding to the precipitation amount.
Figure 23:
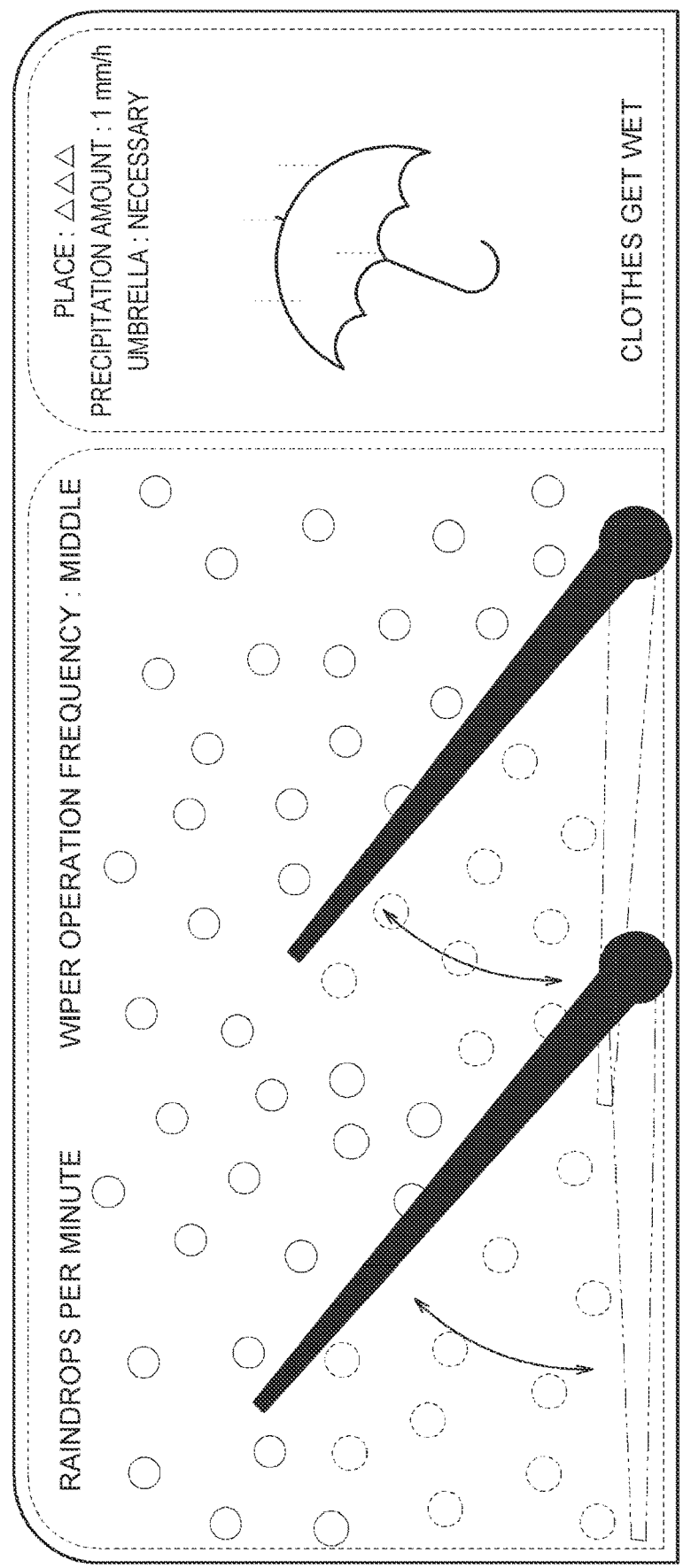
FIG. 23 shows another example of the display corresponding to the precipitation amount.
Figure 24:
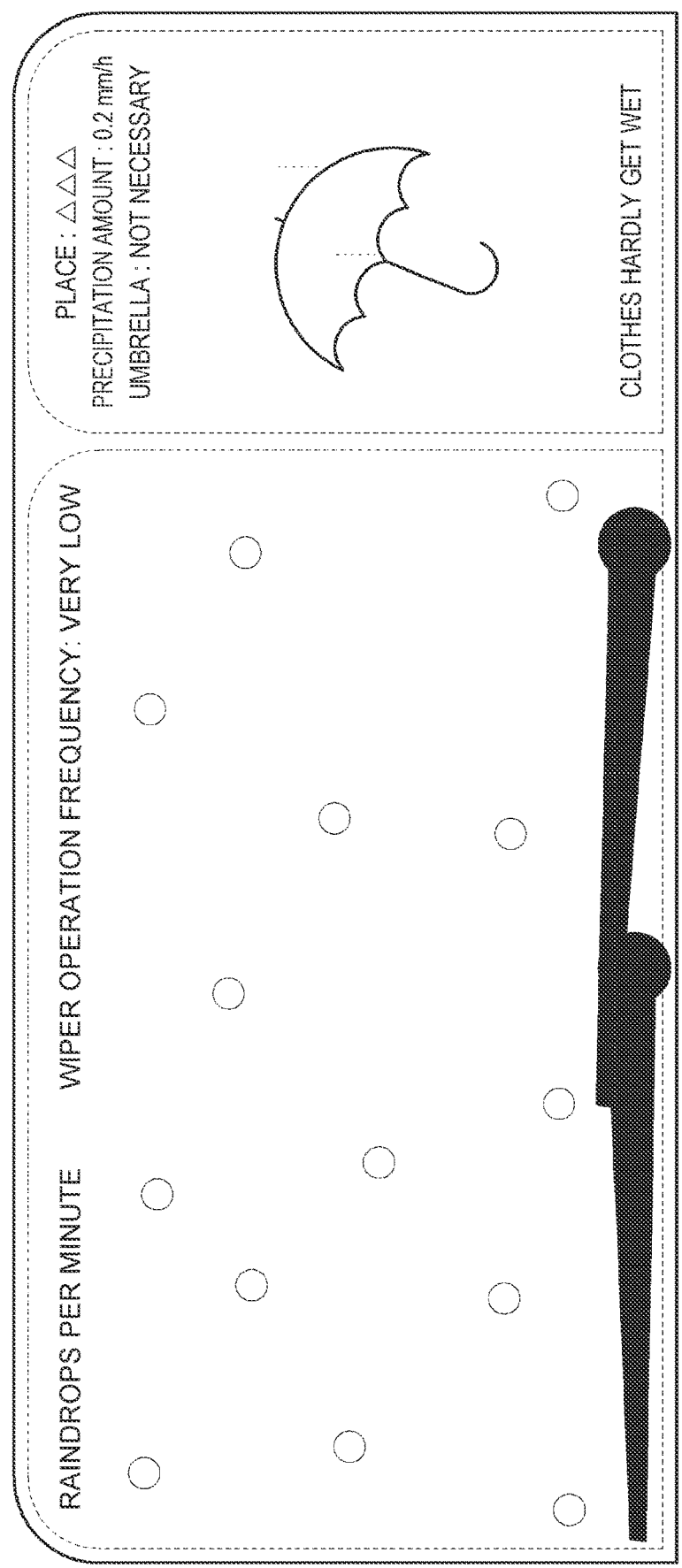
FIG. 24 shows another example of the display corresponding to the precipitation amount.

The display screen of FIG. 22, which includes information on an outing destination, raindrops, ripples, and the necessity of an umbrella, indicates that an umbrella is not necessary and that clothes will hardly get wet. The display screen of FIG. 23 includes information on wiper operation in addition to the information on an outing destination, raindrops, ripples, and the necessity of an umbrella. The display screen indicates that an umbrella is necessary and that the wiper is operating at a middle frequency. The display screen of FIG. 24 includes information on an outing destination, raindrops, ripples, the necessity of an umbrella, and wiper operation. The display screen indicates that an umbrella is not necessary and that the wiper is operating at a very low frequency. Although the display screens of FIGS. 21 to 24 display information on the raindrops, the ripples, the necessity of an umbrella, and the wiper operation in combination, the display screen is not limited to these. The display screen in accordance with the precipitation amount may also include only some of these pieces of information. In other words, the display unit 25 may display at least any one of the raindrops, the ripples, the necessity of an umbrella, and the wiper operation based on the precipitation amount of an outing destination.

Operation of Information Providing System
According to Fourth Embodiment

Figure 25:
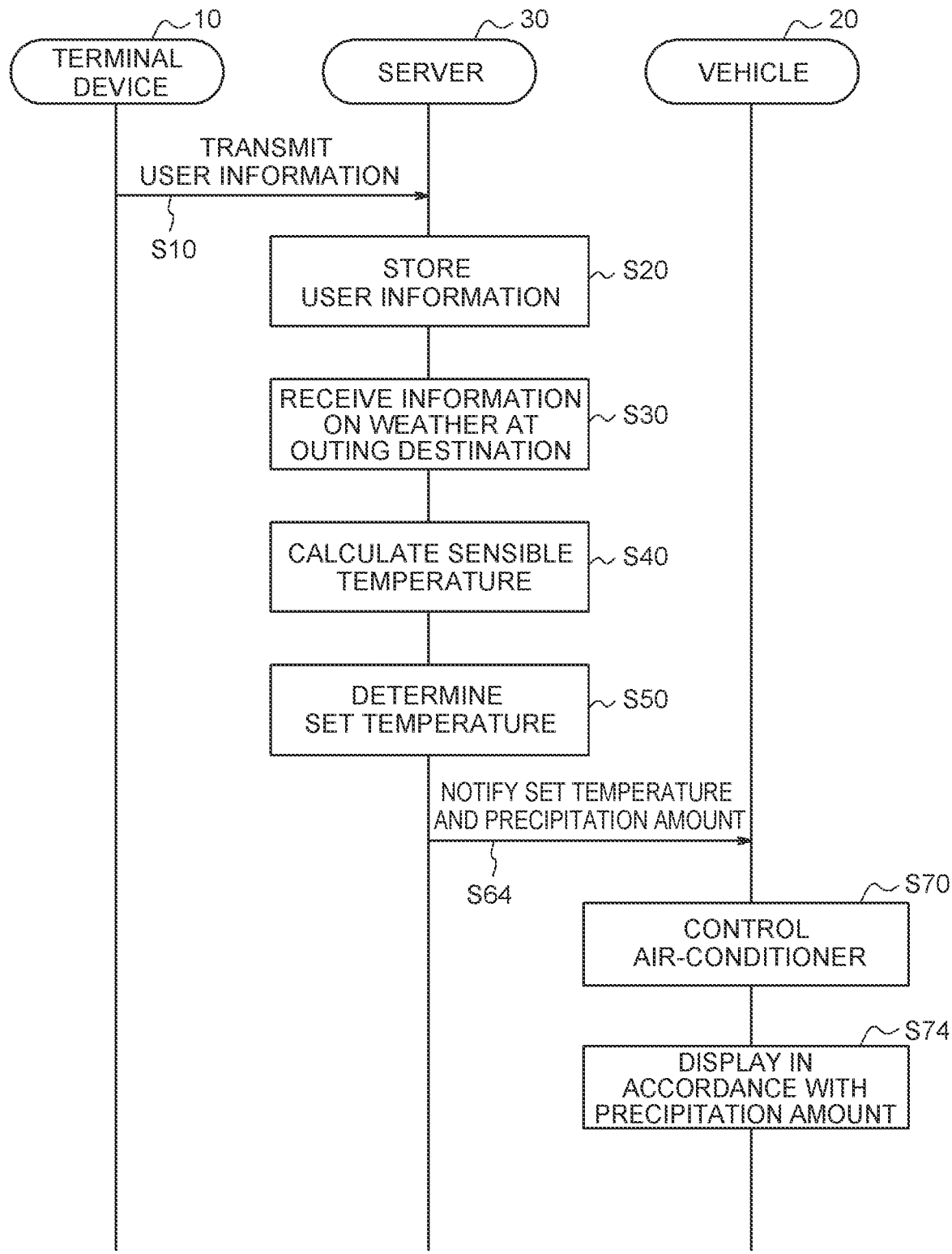
FIG. 25 is a sequence diagram showing operation of the information providing system according to the fourth embodiment.

Description is now given of the operation of the information providing system 1d with reference to a sequence diagram of FIG. 25. The operation identical to the operation described in FIG. 3 is designated by identical reference numeral to omit the description thereof.

Step S64: the server 30 notifies, to the vehicle 20, information on a precipitation amount at an outing destination in addition to the set temperature determined in step S50.

Step S74: the vehicle 20 provides display in accordance with the notified precipitation amount. Specifically, the vehicle 20 may display at least any one of the raindrops, the ripples, the necessity of an umbrella, and the wiper operation based on the precipitation amount at an outing destination.

Thus, the information providing system 1d according to the fourth embodiment controls the air-conditioner 24 of the vehicle 20 based on the set temperature corresponding to the sensible temperature at an outing destination, and provides a user with the display in accordance with the precipitation amount at the outing destination. Therefore, since the system enables the user to feel the sensible temperature at an outing destination, and also visualizes the precipitation amount at the outing destination, it is possible to support the user in preparation for an outing in accordance with the precipitation amount so as to make it easy for the user to determine the necessity of an umbrella, or the like.

Although the display unit 25 provides the display in accordance with the precipitation amount in the above example, the present disclosure is not limited thereto. For example, the server 30 may transmit the information on the precipitation amount to the terminal device 10, and the display unit 14 of the terminal device 10 may provide the display in accordance with the precipitation amount. Both the display unit 25 of the vehicle 20 and the display unit 14 of the terminal device 10 may provide the display in accordance with the precipitation amount. In other words, the server 30 may cause at least one of the display unit 25 of the vehicle 20 and the display unit 14 of the terminal device 10 to provide the display in accordance with the precipitation amount at the outing destination.

Figure 26:
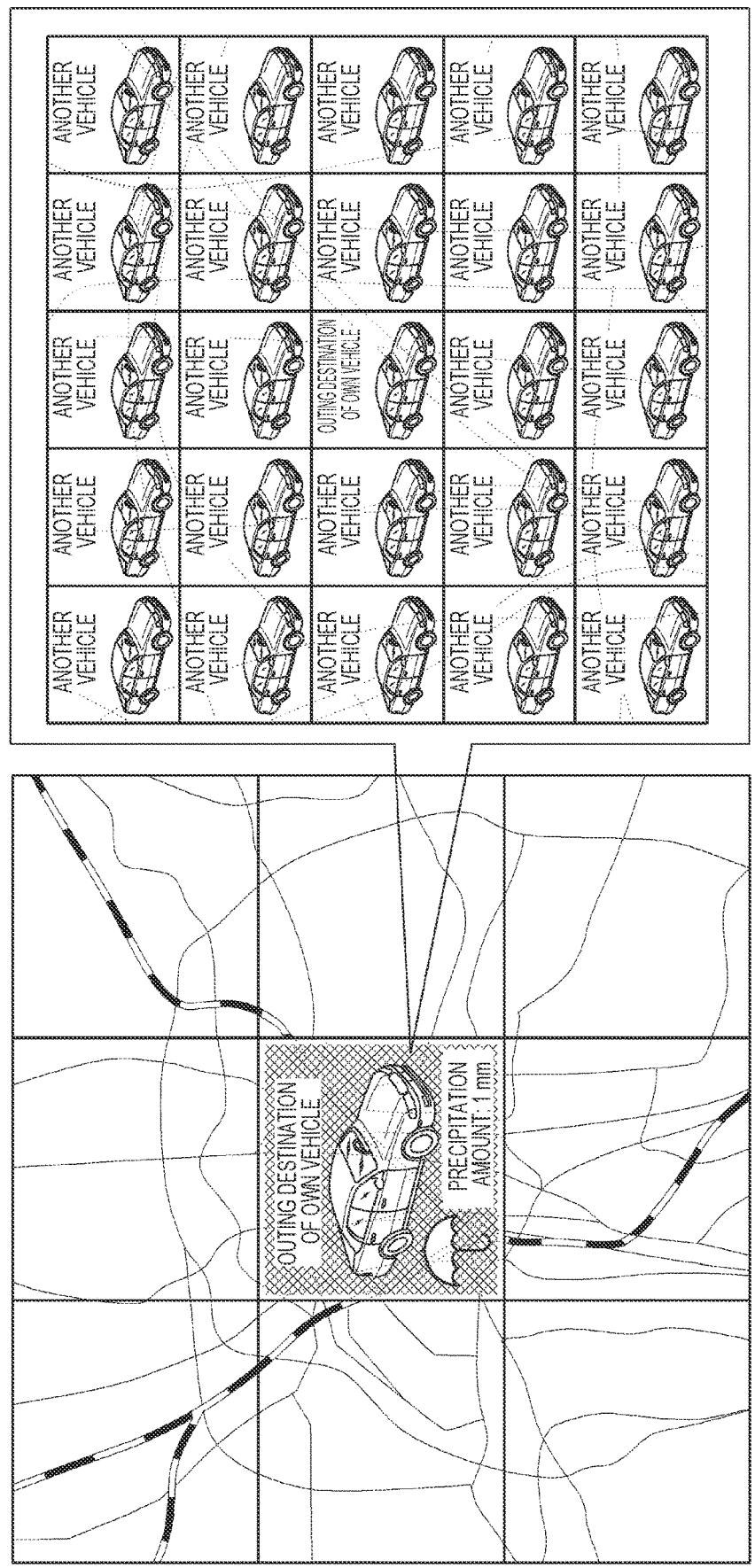
FIG. 26 is a concept view showing a range of information on a use history of wipers of other vehicles.

Here, further based on information on a use history of the wipers of other vehicles at the outing destination, the server control unit 36 may display at least one of the raindrops, the ripples, the necessity of an umbrella, and the wiper operations on at least one of the display unit 25 of the vehicle 20 and the display unit 14 of the terminal device 10. FIG. 26 shows a concept view showing the range of other vehicles used as the information on the use history of the wipers of other vehicles. As shown in FIG. 26, it is assumed that the outing destination of the vehicle 20 belongs to one of mesh-like regions defined on the map. The use history information includes information relating to the use history of the wipers of other vehicles in the region to which the outing destination of the vehicle 20 belongs. The use history information also includes information on the precipitation amount in the region when the wiper is used. The use history information includes the number of times the wiper is operated (X times/minute), and a wiper operation type (MIST, OFF, INT, LO, HI). When the display in accordance with the precipitation amount is provided in the vehicle 20 based on the information on the use history of wipers of other vehicles, the system can provide a user with more reliable information.

In the present embodiment, the outing destination is identified based on user information in steps S10 to S30. However, the present disclosure is not limited to this example. For example, when the user information does not include schedule information, the vehicle 20 may transmit the vehicle information 34 to the server 30, and the server 30 may estimate the outing destination with use of the vehicle information 34 as in the second embodiment.

Although the present disclosure has been described based on drawings and embodiments, it is to be understood that those skilled in the art can easily make various transformations and corrections based on the present disclosure. Therefore, it is to be noted that these transformations and corrections are intended to be embraced in the range of the present disclosure. For example, the functions, or the like, included in each means or each step can be rearranged without causing logical inconsistency, and a plurality of means or steps can be integrated into one entity or can be divided.

For example, a part of the functions executed by the terminal device 10 or the server 30 may be executed by the controller 22. As another example, a general-purpose electronic device, such as a cellular phone, a smartphone, a tablet terminal, or a mobile computer, may be configured to function as the terminal device 10, the controller 22, or the server 30 according to the embodiments describe above. Specifically, a program describing the contents of a process which implement each function of the terminal device 10, the controller 22, or the server 30 according to each of the embodiments is stored in a memory of an electronic device, and the program is read and executed by a processor of the electronic device. Therefore, the disclosure according to the embodiments may be implemented as a program executable by a processor.

Furthermore, the network 40 in the present embodiments includes, in addition to the examples described in the foregoing, an ad hoc network, a local area network (LAN), a metropolitan area network (MAN), a cellular network, a wireless personal area network (WPAN), a public switched telephone network (PSTN), a terrestrial wireless network (TWN), an optical network, or other networks, or any combination thereof. Component members of the wireless network include access points (for example, Wi-Fi access points) and femto cells. Furthermore, a wireless communication device is connectable with a wireless network using Wi-Fi (registered trademark), Bluetooth (registered trademark), a cellular communication technology or other wireless technologies, and technical standards.

What is claimed is:

1. An information providing apparatus, comprising:
   a communication unit configured to communicate with a vehicle used by a user; and
   a control unit configured to
   receive user information on the user and weather information on weather at an outing destination of the user through the communication unit, the outing destination being obtained based on the user information, and
   notify, to the vehicle through the communication unit, a set temperature of an air-conditioner of the vehicle based on a sensible temperature derived based on the weather information.

2. The information providing apparatus according to claim 1, wherein
   the control unit is configured to determine the set temperature in accordance with the sensible temperature and information on vehicle cabin humidity of the vehicle.

3. The information providing apparatus according to claim 1, wherein
   the control unit is configured to
   determine a second set temperature in accordance with an outdoor temperature at the outing destination, and
   notify the second set temperature to the vehicle through the communication unit.

4. The information providing apparatus according to claim 1, wherein
   the control unit is configured to display clothes information corresponding to each of the sensible temperature and an outdoor temperature at the outing destination on at least one of a display unit of the vehicle and a display unit of a terminal device of the user.

5. The information providing apparatus according to claim 4, wherein
   the control unit is configured to
   store a selection history of the clothes information selected by the user, and
   display the selection history on at least one of the display unit of the vehicle and the display unit of the terminal device of the user.

6. The information providing apparatus according to claim 1, wherein
   the control unit is configured to
   display information indicating at least one of raindrops, ripples, necessity of an umbrella, and wiper operation, on at least one of a display unit of the vehicle and a display unit of a terminal device of the user based on a precipitation amount of the outing destination.

7. The information providing apparatus according to claim 6, wherein
   the control unit is configured to display information indicating at least one of the raindrops, the ripples, the necessity of the umbrella, and the wiper operation, on at least one of the display unit of the vehicle and the display unit of the terminal device of the user, further based on information on a use history of wipers of other vehicles at the outing destination.

8. The information providing apparatus according to claim 1, wherein
   the control unit is configured to calculate the sensible temperature at the outing destination based on the weather information.

9. The information providing apparatus according to claim 1, wherein
   the control unit is configured to receive the weather information including information on the sensible temperature.

10. A method for providing information, comprising:
    receiving user information on a user using a vehicle and weather information on weather at an outing destination, the outing destination being obtained based on the user information;
    obtaining a sensible temperature at the outing destination based on the weather information; and
    notifying, to the vehicle, a set temperature of an air-conditioner of the vehicle, the set temperature being derived based on the sensible temperature.

11. A non-transitory storage medium storing a program, the program, upon being executed on a computer, causing the computer to execute the method for providing information according to claim 10.

12. A method of controlling an air-conditioner of a vehicle, comprising:
    acquiring user information on a user using the vehicle and information on an outing destination based on the user information; and
    controlling, based on a sensible temperature derived based on weather information on weather at the outing destination, the air-conditioner of the vehicle.

* * * * *